United States Patent
Nachimuthu et al.

(10) Patent No.: US 12,081,323 B2
(45) Date of Patent: Sep. 3, 2024

(54) TECHNIQUES TO CONTROL SYSTEM UPDATES AND CONFIGURATION CHANGES VIA THE CLOUD

(71) Applicant: Intel Corporation, Santa Clara, CA (US)

(72) Inventors: Murugasamy K. Nachimuthu, Beaverton, OR (US); Mohan J. Kumar, Aloha, OR (US); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/116,957

(22) Filed: Mar. 3, 2023

(65) Prior Publication Data
US 2023/0208731 A1    Jun. 29, 2023

Related U.S. Application Data

(63) Continuation of application No. 15/396,014, filed on Dec. 30, 2016, now abandoned.
(Continued)

(51) Int. Cl.
G06F 8/65 (2018.01)
G02B 6/38 (2006.01)
(Continued)

(52) U.S. Cl.
CPC ............ *H04L 43/08* (2013.01); *G02B 6/3882* (2013.01); *G02B 6/3893* (2013.01);
(Continued)

(58) Field of Classification Search
CPC .. H04Q 11/0003; H04Q 11/0005; H04Q 1/04; H04Q 11/00; H04Q 11/0062;
(Continued)

(56) References Cited

U.S. PATENT DOCUMENTS

| 6,085,295 A | 7/2000 | Ekanadham et al. |
| 6,104,696 A | 8/2000 | Kadambi et al. |

(Continued)

FOREIGN PATENT DOCUMENTS

| CN | 1468007 | 1/2004 |
| CN | 1816003 | 8/2006 |

(Continued)

OTHER PUBLICATIONS

Communication pursuant to Article 94(3) for European Patent Application No. 18191345.0, dated Apr. 16, 2021.
(Continued)

*Primary Examiner* — Wei Y Zhen
*Assistant Examiner* — Mohammed N Huda
(74) *Attorney, Agent, or Firm* — Essential Patents Group, LLP; Christopher K. Gagne

(57) ABSTRACT

Embodiments are generally directed apparatuses, methods, techniques and so forth determine an access level of operation based on an indication received via one or more network links from a pod management controller, and enable or disable a firmware update capability for a firmware device based on the access level of operation, the firmware update capability to change firmware for the firmware device. Embodiments may also include determining one or more configuration settings of a plurality of configuration settings to enable for configuration based on the access level of operation, and enable configuration of the one or more configuration settings.

15 Claims, 18 Drawing Sheets

Related U.S. Application Data

(60) Provisional application No. 62/427,268, filed on Nov. 29, 2016, provisional application No. 62/376,859, filed on Aug. 18, 2016, provisional application No. 62/365,969, filed on Jul. 22, 2016.

(51) Int. Cl.

| | |
|---|---|
| *G02B 6/42* | (2006.01) |
| *G02B 6/44* | (2006.01) |
| *G06F 1/18* | (2006.01) |
| *G06F 1/20* | (2006.01) |
| *G06F 3/06* | (2006.01) |
| *G06F 9/30* | (2018.01) |
| *G06F 9/4401* | (2018.01) |
| *G06F 9/54* | (2006.01) |
| *G06F 12/109* | (2016.01) |
| *G06F 12/14* | (2006.01) |
| *G06F 13/16* | (2006.01) |
| *G06F 13/40* | (2006.01) |
| *G06F 15/16* | (2006.01) |
| *G06F 16/901* | (2019.01) |
| *G08C 17/02* | (2006.01) |
| *G11C 5/02* | (2006.01) |
| *G11C 7/10* | (2006.01) |
| *G11C 11/56* | (2006.01) |
| *G11C 14/00* | (2006.01) |
| *H03M 7/30* | (2006.01) |
| *H03M 7/40* | (2006.01) |
| *H04B 10/25* | (2013.01) |
| *H04L 41/14* | (2022.01) |
| *H04L 43/08* | (2022.01) |
| *H04L 43/0817* | (2022.01) |
| *H04L 43/0876* | (2022.01) |
| *H04L 43/0894* | (2022.01) |
| *H04L 49/00* | (2022.01) |
| *H04L 49/25* | (2022.01) |
| *H04L 49/356* | (2022.01) |
| *H04L 49/45* | (2022.01) |
| *H04L 67/02* | (2022.01) |
| *H04L 67/12* | (2022.01) |
| *H04L 67/306* | (2022.01) |
| *H04L 69/04* | (2022.01) |
| *H04L 69/329* | (2022.01) |
| *H04Q 11/00* | (2006.01) |
| *H05K 7/14* | (2006.01) |
| *B25J 15/00* | (2006.01) |
| *B65G 1/04* | (2006.01) |
| *G05D 23/19* | (2006.01) |
| *G05D 23/20* | (2006.01) |
| *G06F 9/38* | (2018.01) |
| *G06F 9/50* | (2006.01) |
| *G06F 11/14* | (2006.01) |
| *G06F 11/34* | (2006.01) |
| *G06F 12/0862* | (2016.01) |
| *G06F 12/0893* | (2016.01) |
| *G06F 12/10* | (2016.01) |
| *G06F 13/42* | (2006.01) |
| *G06F 15/80* | (2006.01) |
| *G06Q 10/06* | (2023.01) |
| *G06Q 10/0631* | (2023.01) |
| *G06Q 10/087* | (2023.01) |
| *G06Q 10/20* | (2023.01) |
| *G06Q 50/04* | (2012.01) |
| *G07C 5/00* | (2006.01) |
| *G11C 5/06* | (2006.01) |
| *H04J 14/00* | (2006.01) |
| *H04L 9/06* | (2006.01) |
| *H04L 9/14* | (2006.01) |
| *H04L 9/32* | (2006.01) |
| *H04L 12/28* | (2006.01) |
| *H04L 41/02* | (2022.01) |
| *H04L 41/046* | (2022.01) |
| *H04L 41/0813* | (2022.01) |
| *H04L 41/082* | (2022.01) |
| *H04L 41/0896* | (2022.01) |
| *H04L 41/12* | (2022.01) |
| *H04L 41/147* | (2022.01) |
| *H04L 41/5019* | (2022.01) |
| *H04L 43/065* | (2022.01) |
| *H04L 43/16* | (2022.01) |
| *H04L 45/02* | (2022.01) |
| *H04L 45/52* | (2022.01) |
| *H04L 47/24* | (2022.01) |
| *H04L 47/38* | (2022.01) |
| *H04L 47/70* | (2022.01) |
| *H04L 47/765* | (2022.01) |
| *H04L 47/78* | (2022.01) |
| *H04L 47/80* | (2022.01) |
| *H04L 49/15* | (2022.01) |
| *H04L 49/55* | (2022.01) |
| *H04L 61/00* | (2022.01) |
| *H04L 67/00* | (2022.01) |
| *H04L 67/10* | (2022.01) |
| *H04L 67/1004* | (2022.01) |
| *H04L 67/1008* | (2022.01) |
| *H04L 67/1012* | (2022.01) |
| *H04L 67/1014* | (2022.01) |
| *H04L 67/1029* | (2022.01) |
| *H04L 67/1034* | (2022.01) |
| *H04L 67/1097* | (2022.01) |
| *H04L 67/51* | (2022.01) |
| *H04Q 1/04* | (2006.01) |
| *H04W 4/02* | (2018.01) |
| *H04W 4/80* | (2018.01) |
| *H05K 1/02* | (2006.01) |
| *H05K 1/18* | (2006.01) |
| *H05K 5/02* | (2006.01) |
| *H05K 7/20* | (2006.01) |
| *H05K 13/04* | (2006.01) |

(52) U.S. Cl.
CPC ......... *G02B 6/3897* (2013.01); *G02B 6/4292* (2013.01); *G02B 6/4452* (2013.01); *G06F 1/183* (2013.01); *G06F 1/20* (2013.01); *G06F 3/0613* (2013.01); *G06F 3/0625* (2013.01); *G06F 3/064* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/4022* (2013.01); *G06F 13/4068* (2013.01); *G06F 13/409* (2013.01); *G06F 15/161* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01);

H03M 7/3086 (2013.01); H03M 7/4056 (2013.01); H03M 7/4081 (2013.01); H04B 10/25891 (2020.05); H04L 41/145 (2013.01); H04L 43/0817 (2013.01); H04L 43/0876 (2013.01); H04L 43/0894 (2013.01); H04L 49/00 (2013.01); H04L 49/25 (2013.01); H04L 49/357 (2013.01); H04L 49/45 (2013.01); H04L 67/02 (2013.01); H04L 67/306 (2013.01); H04L 69/04 (2013.01); H04L 69/329 (2013.01); H04Q 11/0003 (2013.01); H05K 7/1442 (2013.01); B25J 15/0014 (2013.01); B65G 1/0492 (2013.01); G05D 23/1921 (2013.01); G05D 23/2039 (2013.01); G06F 3/061 (2013.01); G06F 3/0611 (2013.01); G06F 3/0616 (2013.01); G06F 3/0619 (2013.01); G06F 3/0631 (2013.01); G06F 3/0638 (2013.01); G06F 3/0647 (2013.01); G06F 3/0658 (2013.01); G06F 3/0659 (2013.01); G06F 3/067 (2013.01); G06F 9/3887 (2013.01); G06F 9/5016 (2013.01); G06F 9/5044 (2013.01); G06F 9/505 (2013.01); G06F 9/5072 (2013.01); G06F 9/5077 (2013.01); G06F 11/141 (2013.01); G06F 11/3414 (2013.01); G06F 12/0862 (2013.01); G06F 12/0893 (2013.01); G06F 12/10 (2013.01); G06F 13/161 (2013.01); G06F 13/1694 (2013.01); G06F 13/42 (2013.01); G06F 13/4282 (2013.01); G06F 15/8061 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/06 (2013.01); G06Q 10/06314 (2013.01); G06Q 10/087 (2013.01); G06Q 10/20 (2013.01); G06Q 50/04 (2013.01); G07C 5/008 (2013.01); G08C 2200/00 (2013.01); G11C 5/06 (2013.01); H03M 7/30 (2013.01); H03M 7/3084 (2013.01); H03M 7/40 (2013.01); H03M 7/4031 (2013.01); H03M 7/6005 (2013.01); H03M 7/6023 (2013.01); H04B 10/25 (2013.01); H04J 14/00 (2013.01); H04L 9/0643 (2013.01); H04L 9/14 (2013.01); H04L 9/3247 (2013.01); H04L 9/3263 (2013.01); H04L 12/2809 (2013.01); H04L 41/024 (2013.01); H04L 41/046 (2013.01); H04L 41/0813 (2013.01); H04L 41/082 (2013.01); H04L 41/0896 (2013.01); H04L 41/12 (2013.01); H04L 41/147 (2013.01); H04L 41/5019 (2013.01); H04L 43/065 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/15 (2013.01); H04L 49/555 (2013.01); H04L 61/00 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/34 (2013.01); H04L 67/51 (2022.05); H04Q 1/04 (2013.01); H04Q 11/00 (2013.01); H04Q 11/0005 (2013.01); H04Q 2011/0037 (2013.01); H04Q 2011/0041 (2013.01); H04Q 2011/0052 (2013.01); H04Q 11/0062 (2013.01); H04Q 11/0071 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/00 (2018.01); Y02P 90/30 (2015.11); Y04S 10/50 (2013.01); Y04S 10/52 (2013.01); Y10S 901/01 (2013.01)

(58) Field of Classification Search
CPC . H04Q 11/0071; G06F 16/9014; G06F 1/183; G06F 1/20; G06F 3/061; G06F 3/0611; G06F 3/0613; G06F 3/0616; G06F 3/0619; G06F 3/0625; G06F 3/0631; G06F 3/0638; G06F 3/064; G06F 3/0647; G06F 3/0653; G06F 3/0655; G06F 3/0658; G06F 3/0659; G06F 3/0664; G06F 3/0665; G06F 3/067; G06F 3/0673; G06F 3/0679; G06F 3/0683; G06F 3/0688; G06F 3/0689; G06F 8/65; G06F 9/30036; G06F 9/3887; G06F 9/4401; G06F 9/4411; G06F 9/5016; G06F 9/5044; G06F 9/505; G06F 9/5072; G06F 9/5077; G06F 9/544; G06F 11/141; G06F 11/3414; G06F 12/0862; G06F 12/0893; G06F 12/10; G06F 12/109; G06F 12/1408; G06F 13/1668; G06F 13/1694; G06F 13/4022; G06F 13/4068; G06F 13/409; G06F 13/42; G06F 13/4282; G06F 15/8061; G06F 15/161; B25J 15/0014; B65G 1/0492; G02B 6/3882; G02B 6/3893; G02B 6/3897; G02B 6/4292; G02B 6/4452; G05D 23/1921; G05D 23/2039; G06Q 10/06; G06Q 10/06314; G07C 5/008; G08C 17/02; G11C 5/02; G11C 5/06; G11C 7/1072; G11C 11/56; G11C 14/0009; H03M 7/30; H03M 7/3084; H03M 7/3086; H03M 7/40; H03M 7/4031; H03M 7/4056; H03M 7/4081; H03M 7/6005; H03M 7/6023; H04B 10/2504; H04B 10/25891; H04L 9/0643; H04L 9/14; H04L 9/3247; H04L 9/3263; H04L 12/2809; H04L 29/12009; H04L 41/024; H04L 41/046;

H04L 41/0813; H04L 41/082; H04L 41/0896; H04L 41/145; H04L 41/147; H04L 43/08; H04L 43/0817; H04L 43/0876; H04L 43/0894; H04L 43/16; H04L 45/02; H04L 45/52; H04L 47/24; H04L 47/38; H04L 47/765; H04L 47/782; H04L 47/805; H04L 47/82; H04L 47/823; H04L 49/00; H04L 49/15; H04L 49/25; H04L 49/357; H04L 49/45; H04L 49/555; H04L 63/06; H04L 63/08; H04L 63/10; H04L 63/20; H04L 67/02; H04L 67/10; H04L 67/1004; H04L 67/1008; H04L 67/1012; H04L 67/1014; H04L 67/1029; H04L 67/1034; H04L 67/1097; H04L 67/12; H04L 67/16; H04L 67/306; H04L 67/34; H04L 69/04; H04L 69/329; H04W 4/023; H05K 1/0203; H05K 1/181; H05K 5/0204; H05K 7/1418; H05K 7/1421; H05K 7/1442; H05K 7/1447; H05K 7/1461; H05K 7/1487; H05K 7/1489; H05K 7/1491; H05K 7/1492; H05K 7/1498; H05K 7/2039; H05K 7/20709; H05K 7/20727; H05K 7/20736; H05K 7/20745; H05K 7/20836; H05K 13/0486

USPC .......................................................... 717/172

See application file for complete search history.

(56) References Cited

U.S. PATENT DOCUMENTS

| | | | |
|---|---|---|---|
| 6,115,372 A | 9/2000 | Dinha | |
| 6,353,885 B1 | 3/2002 | Herzi et al. | |
| 6,367,018 B1 | 4/2002 | Jain | |
| 6,650,620 B1 | 11/2003 | Neogi | |
| 6,714,549 B1 | 3/2004 | Phaltankar | |
| 7,415,022 B2 | 8/2008 | Kadambi et al. | |
| 7,739,677 B1 | 6/2010 | Kekre et al. | |
| 7,835,388 B2 | 11/2010 | Hu | |
| 7,962,736 B1 | 6/2011 | Polyudov | |
| 8,248,928 B1 | 8/2012 | Wang et al. | |
| 8,788,663 B1 | 7/2014 | Adogla et al. | |
| 8,812,765 B2 | 8/2014 | Dai et al. | |
| 9,026,765 B1 | 5/2015 | Marshak et al. | |
| 9,042,402 B1 | 5/2015 | Loganathan et al. | |
| 9,143,406 B2 | 9/2015 | Waggener et al. | |
| 9,253,055 B2 | 2/2016 | Nelke et al. | |
| 9,612,767 B2 * | 4/2017 | Huang et al. | G06F 3/067 |
| 9,733,980 B1 | 8/2017 | Khan et al. | |
| 9,859,918 B1 | 1/2018 | Gopal | |
| 9,893,988 B2 | 2/2018 | Agarwal et al. | |
| 9,929,747 B2 | 3/2018 | Gopal | |
| 9,936,613 B2 | 4/2018 | Adiletta | |
| 9,954,552 B2 | 4/2018 | Gopal | |
| 9,973,207 B2 | 5/2018 | Gopal | |
| 10,033,404 B2 | 7/2018 | Cutter | |
| 10,034,407 B2 | 7/2018 | Miller | |
| 10,045,098 B2 | 8/2018 | Adiletta | |
| 10,070,207 B2 | 9/2018 | Adiletta et al. | |
| 10,085,358 B2 | 9/2018 | Adiletta | |
| 10,091,904 B2 | 10/2018 | Miller | |
| 10,116,327 B2 | 10/2018 | Cutter | |
| 10,191,684 B2 | 1/2019 | Gopal et al. | |
| 10,234,833 B2 | 3/2019 | Ahuja | |
| 10,263,637 B2 | 4/2019 | Gopal | |
| 10,268,412 B2 | 4/2019 | Guilford | |
| 10,313,769 B2 | 6/2019 | Miller | |
| 10,334,334 B2 | 6/2019 | Miller | |
| 10,348,327 B2 | 7/2019 | Adiletta | |
| 10,349,152 B2 | 7/2019 | Adiletta | |
| 10,356,495 B2 | 7/2019 | Adiletta | |
| 10,368,148 B2 | 7/2019 | Kumar | |
| 10,390,114 B2 | 8/2019 | Schmisseur | |
| 10,397,670 B2 | 8/2019 | Gorius | |
| 10,411,729 B2 | 9/2019 | Miller | |
| 10,448,126 B2 | 10/2019 | Gilsdorf | |
| 10,461,774 B2 | 10/2019 | Balle | |
| 10,469,252 B2 | 11/2019 | Schmisseur | |
| 10,474,460 B2 | 11/2019 | Adiletta | |
| 10,476,670 B2 | 11/2019 | Schmisseur | |
| 10,489,156 B2 | 11/2019 | Munoz | |
| 10,542,333 B2 | 1/2020 | Miller | |
| 10,963,176 B2 | 3/2021 | Balle et al. | |
| 10,990,309 B2 | 4/2021 | Bernat et al. | |
| 11,029,870 B2 | 6/2021 | Balle et al. | |
| 11,128,553 B2 | 9/2021 | Adiletta et al. | |
| 11,507,430 B2 * | 11/2022 | Subramanian et al. | G06F 9/50 |
| 11,630,702 B2 | 4/2023 | Kumar et al. | |
| 2003/0026525 A1 | 2/2003 | Alvarez | |
| 2003/0028594 A1 | 2/2003 | Laschkewitsch et al. | |
| 2004/0205304 A1 | 10/2004 | Mckenney et al. | |
| 2005/0135231 A1 | 6/2005 | Bellovin | |
| 2006/0036719 A1 | 2/2006 | Bodin et al. | |
| 2006/0059492 A1 | 3/2006 | Fellenstein et al. | |
| 2006/0168337 A1 | 7/2006 | Stahl et al. | |
| 2006/0184670 A1 | 8/2006 | Beeson et al. | |
| 2006/0239270 A1 | 10/2006 | Yao et al. | |
| 2007/0147400 A1 | 6/2007 | Hu | |
| 2008/0075071 A1 | 3/2008 | Beshai | |
| 2008/0229318 A1 | 9/2008 | Franke | |
| 2009/0198792 A1 | 8/2009 | Wittenschlaeger | |
| 2010/0191823 A1 | 7/2010 | Archer et al. | |
| 2011/0185125 A1 | 7/2011 | Jain et al. | |
| 2011/0228767 A1 | 9/2011 | Singla et al. | |
| 2011/0296231 A1 | 12/2011 | Dake | |
| 2012/0054770 A1 | 3/2012 | Krishnamurthy et al. | |
| 2012/0099863 A1 | 4/2012 | Xu et al. | |
| 2012/0207139 A1 | 8/2012 | Husted et al. | |
| 2012/0230343 A1 | 9/2012 | Schrum, Jr. | |
| 2012/0303885 A1 | 11/2012 | Jeddeloh | |
| 2013/0159638 A1 | 6/2013 | Koinuma et al. | |
| 2013/0179485 A1 | 7/2013 | Chapman et al. | |
| 2013/0232495 A1 | 9/2013 | Rossbach et al. | |
| 2013/0297769 A1 * | 11/2013 | Chang et al. | G06F 9/5077 709/224 |
| 2013/0325998 A1 | 12/2013 | Hormuth et al. | |
| 2014/0012961 A1 | 1/2014 | Pope | |
| 2014/0047272 A1 | 2/2014 | Breternitz et al. | |
| 2014/0047341 A1 | 2/2014 | Breternitz et al. | |
| 2014/0359044 A1 | 12/2014 | Davis et al. | |
| 2015/0007182 A1 | 1/2015 | Rossbach et al. | |
| 2015/0106804 A1 | 4/2015 | Chandrashekhar et al. | |
| 2015/0229529 A1 | 8/2015 | Engebretsen | |
| 2015/0281065 A1 | 10/2015 | Liljenstolpe | |
| 2015/0333824 A1 | 11/2015 | Swinkels et al. | |
| 2015/0334867 A1 | 11/2015 | Faw et al. | |
| 2015/0381426 A1 | 12/2015 | Roese et al. | |
| 2016/0050194 A1 | 2/2016 | Rachmiel | |
| 2016/0087847 A1 | 3/2016 | Krithivas et al. | |
| 2016/0088578 A1 * | 3/2016 | Das et al. | H04L 49/25 370/350 |
| 2016/0118121 A1 | 4/2016 | Kelly et al. | |
| 2016/0127191 A1 | 5/2016 | Nair | |
| 2016/0147592 A1 | 5/2016 | Guddeti | |
| 2016/0162281 A1 | 6/2016 | Hokiyama | |
| 2016/0164739 A1 | 6/2016 | Skalecki | |
| 2016/0231939 A1 | 8/2016 | Cannata et al. | |
| 2016/0234580 A1 | 8/2016 | Clarke et al. | |
| 2016/0306663 A1 | 10/2016 | Chang et al. | |
| 2016/0306677 A1 | 10/2016 | Hira et al. | |
| 2017/0046179 A1 | 2/2017 | Teh et al. | |
| 2017/0070431 A1 | 3/2017 | Nidumolu et al. | |
| 2017/0076195 A1 | 3/2017 | Yang et al. | |
| 2017/0093756 A1 | 3/2017 | Bernat et al. | |
| 2017/0116004 A1 | 4/2017 | Devegowda et al. | |
| 2017/0150621 A1 | 5/2017 | Breakstone et al. | |
| 2017/0185786 A1 | 6/2017 | Ylinen et al. | |
| 2017/0199746 A1 | 7/2017 | Nguyen et al. | |
| 2017/0223436 A1 | 8/2017 | Moynihan et al. | |
| 2017/0251077 A1 | 8/2017 | Eerpini et al. | |
| 2017/0257970 A1 | 9/2017 | Alleman et al. | |
| 2017/0279705 A1 | 9/2017 | Lin et al. | |

(56) References Cited

U.S. PATENT DOCUMENTS

| | | |
|---|---|---|
| 2017/0315798 A1 | 11/2017 | Shivanna et al. |
| 2017/0317945 A1 | 11/2017 | Guo et al. |
| 2017/0329860 A1* | 11/2017 | Jones ................. H04L 67/02 |
| 2018/0004835 A1 | 1/2018 | Piechowicz et al. |
| 2018/0014306 A1 | 1/2018 | Adiletta |
| 2018/0014757 A1 | 1/2018 | Kumar |
| 2018/0017700 A1 | 1/2018 | Adiletta |
| 2018/0020054 A1 | 1/2018 | Woodcare et al. |
| 2018/0024578 A1 | 1/2018 | Ahuja |
| 2018/0024739 A1 | 1/2018 | Schmisseur |
| 2018/0024740 A1 | 1/2018 | Miller |
| 2018/0024752 A1 | 1/2018 | Miller |
| 2018/0024756 A1 | 1/2018 | Miller |
| 2018/0024764 A1 | 1/2018 | Miller |
| 2018/0024771 A1 | 1/2018 | Miller |
| 2018/0024775 A1 | 1/2018 | Miller |
| 2018/0024776 A1 | 1/2018 | Miller |
| 2018/0024838 A1 | 1/2018 | Nachimuthu |
| 2018/0024860 A1 | 1/2018 | Balle |
| 2018/0024861 A1 | 1/2018 | Balle |
| 2018/0024864 A1 | 1/2018 | Wilde |
| 2018/0024867 A1 | 1/2018 | Gilsdorf |
| 2018/0024932 A1 | 1/2018 | Nachimuthu et al. |
| 2018/0024947 A1 | 1/2018 | Miller |
| 2018/0024957 A1 | 1/2018 | Nachimuthu |
| 2018/0024958 A1 | 1/2018 | Nachimuthu |
| 2018/0024960 A1 | 1/2018 | Wagh |
| 2018/0025299 A1 | 1/2018 | Kumar |
| 2018/0026652 A1 | 1/2018 | Cutter |
| 2018/0026653 A1 | 1/2018 | Cutter |
| 2018/0026654 A1 | 1/2018 | Gopal |
| 2018/0026655 A1 | 1/2018 | Gopal |
| 2018/0026656 A1 | 1/2018 | Gopal |
| 2018/0026800 A1 | 1/2018 | Munoz |
| 2018/0026835 A1 | 1/2018 | Nachimuthu |
| 2018/0026849 A1 | 1/2018 | Guim |
| 2018/0026851 A1 | 1/2018 | Adiletta |
| 2018/0026868 A1 | 1/2018 | Guim |
| 2018/0026882 A1 | 1/2018 | Gorius |
| 2018/0026904 A1 | 1/2018 | Van De Groenendaal |
| 2018/0026905 A1 | 1/2018 | Balle et al. |
| 2018/0026906 A1 | 1/2018 | Balle |
| 2018/0026907 A1 | 1/2018 | Miller |
| 2018/0026908 A1 | 1/2018 | Nachimuthu |
| 2018/0026910 A1 | 1/2018 | Balle et al. |
| 2018/0026912 A1 | 1/2018 | Guim |
| 2018/0026913 A1 | 1/2018 | Balle |
| 2018/0026918 A1 | 1/2018 | Kumar |
| 2018/0027055 A1 | 1/2018 | Balle et al. |
| 2018/0027057 A1 | 1/2018 | Balle |
| 2018/0027058 A1 | 1/2018 | Balle et al. |
| 2018/0027059 A1 | 1/2018 | Miller |
| 2018/0027060 A1 | 1/2018 | Metsch et al. |
| 2018/0027062 A1 | 1/2018 | Bernat |
| 2018/0027063 A1 | 1/2018 | Nachimuthu |
| 2018/0027066 A1 | 1/2018 | Van De Groenendaal et al. |
| 2018/0027067 A1 | 1/2018 | Guim |
| 2018/0027093 A1 | 1/2018 | Guim |
| 2018/0027312 A1 | 1/2018 | Adiletta |
| 2018/0027313 A1 | 1/2018 | Adiletta |
| 2018/0027376 A1 | 1/2018 | Kumar |
| 2018/0027679 A1 | 1/2018 | Schmisseur |
| 2018/0027680 A1 | 1/2018 | Kumar |
| 2018/0027682 A1 | 1/2018 | Adiletta |
| 2018/0027684 A1 | 1/2018 | Miller |
| 2018/0027685 A1 | 1/2018 | Miller |
| 2018/0027686 A1 | 1/2018 | Adiletta |
| 2018/0027687 A1 | 1/2018 | Adiletta |
| 2018/0027688 A1 | 1/2018 | Adiletta |
| 2018/0027703 A1 | 1/2018 | Adiletta |
| 2018/0266510 A1 | 1/2018 | Gopal |
| 2018/0067857 A1 | 3/2018 | Wang et al. |
| 2018/0077235 A1 | 3/2018 | Nachimuthu et al. |
| 2018/0150240 A1 | 5/2018 | Bernat et al. |
| 2018/0150256 A1 | 5/2018 | Kumar |
| 2018/0150293 A1 | 5/2018 | Nachimuthu |
| 2018/0150298 A1 | 5/2018 | Balle |
| 2018/0150299 A1 | 5/2018 | Balle |
| 2018/0150330 A1 | 5/2018 | Bernat |
| 2018/0150334 A1 | 5/2018 | Bernat et al. |
| 2018/0150343 A1 | 5/2018 | Bernat |
| 2018/0150372 A1 | 5/2018 | Nachimuthu |
| 2018/0150391 A1 | 5/2018 | Mitchel |
| 2018/0150419 A1 | 5/2018 | Steinmacher-Burow |
| 2018/0150471 A1 | 5/2018 | Gopal |
| 2018/0150644 A1 | 5/2018 | Khanna |
| 2018/0151975 A1 | 5/2018 | Aoki |
| 2018/0152200 A1 | 5/2018 | Guilford |
| 2018/0152201 A1 | 5/2018 | Gopal |
| 2018/0152202 A1 | 5/2018 | Gopal |
| 2018/0152317 A1 | 5/2018 | Chang |
| 2018/0152366 A1 | 5/2018 | Cornett |
| 2018/0152383 A1 | 5/2018 | Burres |
| 2018/0152540 A1 | 5/2018 | Niell |
| 2018/0165199 A1* | 6/2018 | Brandt et al. ....... G06F 9/30043 |
| 2018/0205392 A1 | 7/2018 | Gopal |
| 2018/0293493 A1 | 10/2018 | Kalamkar et al. |
| 2019/0014396 A1 | 1/2019 | Adiletta |
| 2019/0021182 A1 | 1/2019 | Adiletta |
| 2019/0034102 A1 | 1/2019 | Miller |
| 2019/0034383 A1 | 1/2019 | Schmisseur |
| 2019/0034490 A1 | 1/2019 | Yap |
| 2019/0035483 A1 | 1/2019 | Schmisseur |
| 2019/0042090 A1 | 2/2019 | Raghunath |
| 2019/0042091 A1 | 2/2019 | Raghunath |
| 2019/0042122 A1 | 2/2019 | Schmisseur |
| 2019/0042126 A1 | 2/2019 | Sen |
| 2019/0042136 A1 | 2/2019 | Nachimuthu |
| 2019/0042234 A1 | 2/2019 | Bernat |
| 2019/0042277 A1 | 2/2019 | Nachimuthu |
| 2019/0042408 A1 | 2/2019 | Schmisseur |
| 2019/0042611 A1 | 2/2019 | Yap |
| 2019/0044809 A1 | 2/2019 | Willis |
| 2019/0044849 A1 | 2/2019 | Ganguli |
| 2019/0044859 A1 | 2/2019 | Sundar |
| 2019/0052457 A1 | 2/2019 | Connor |
| 2019/0062053 A1 | 2/2019 | Jensen |
| 2019/0065083 A1 | 2/2019 | Sen |
| 2019/0065112 A1 | 2/2019 | Schmisseur |
| 2019/0065172 A1 | 2/2019 | Nachimuthu |
| 2019/0065212 A1 | 2/2019 | Kumar |
| 2019/0065231 A1 | 2/2019 | Schmisseur |
| 2019/0065253 A1 | 2/2019 | Bernat |
| 2019/0065260 A1 | 2/2019 | Balle |
| 2019/0065261 A1 | 2/2019 | Narayan |
| 2019/0065281 A1 | 2/2019 | Bernat et al. |
| 2019/0065290 A1 | 2/2019 | Custodio |
| 2019/0065401 A1 | 2/2019 | Dormitzer |
| 2019/0065415 A1 | 2/2019 | Nachimuthu |
| 2019/0067848 A1 | 2/2019 | Aoki |
| 2019/0068444 A1 | 2/2019 | Grecco |
| 2019/0068464 A1 | 2/2019 | Bernat |
| 2019/0068466 A1 | 2/2019 | Chagam |
| 2019/0068509 A1 | 2/2019 | Hyatt |
| 2019/0068521 A1 | 2/2019 | Kumar |
| 2019/0068523 A1 | 2/2019 | Chagam |
| 2019/0068693 A1 | 2/2019 | Bernat |
| 2019/0068696 A1 | 2/2019 | Sen |
| 2019/0068698 A1 | 2/2019 | Kumar |
| 2019/0069433 A1 | 2/2019 | Balle |
| 2019/0069434 A1 | 2/2019 | Aoki |
| 2019/0129874 A1 | 5/2019 | Huang et al. |
| 2019/0196824 A1 | 6/2019 | Liu |
| 2019/0205745 A1 | 7/2019 | Sridharan et al. |
| 2019/0307014 A1 | 10/2019 | Adiletta |
| 2019/0342642 A1 | 11/2019 | Adiletta |
| 2019/0342643 A1 | 11/2019 | Adiletta |
| 2019/0387291 A1 | 12/2019 | Adiletta |
| 2020/0007511 A1 | 1/2020 | Van De Groenendaal et al. |
| 2020/0226027 A1 | 7/2020 | Krasner et al. |
| 2020/0241926 A1 | 7/2020 | Guim Bernat |
| 2020/0341810 A1 | 10/2020 | Ranganathan et al. |

(56) References Cited

U.S. PATENT DOCUMENTS

| | | |
|---|---|---|
| 2021/0103544 A1 | 4/2021 | Guim Bernat et al. |
| 2021/0209035 A1 | 7/2021 | Galbi et al. |
| 2021/0377140 A1 | 12/2021 | Adiletta |

FOREIGN PATENT DOCUMENTS

| | | |
|---|---|---|
| CN | 103634330 | 3/2014 |
| CN | 105183561 | 12/2015 |
| CN | 105721358 | 6/2016 |
| CN | 105979007 | 9/2016 |
| DE | 112015006944 | 3/2023 |
| JP | 2002158733 | 5/2002 |
| WO | 2017052575 | 3/2017 |
| WO | 2018102414 | 6/2018 |
| WO | 2018111228 | 6/2018 |
| WO | 2020190801 | 9/2020 |

OTHER PUBLICATIONS

Corrected Notice of Allowability for U.S. Appl. No. 17/015,479, dated Jun. 3, 2021.
Extended European Search Report for European Patent Application No. 181934.0, dated Feb. 11, 2019.
Extended European Search Report for European Patent Application No. 20217841.4, dated Apr. 16, 2021.
Final Office Action for U.S. Appl. No. 15/719,770, dated Jun. 24, 2020.
International Preliminary Report on Patentability for PCT Application No. PCT/US2017/038552, dated Jan. 22, 2019.
International Preliminary Report on Patentability for PCT Application No. PCT/US2017/063765, dated Jun. 4, 2019.
International Search Report and Written Opinion for PCT Application No. PCT/US2017/038552, dated Oct. 11, 2017, 3 pages.
International Search Report and Written Opinion for PCT Application No. PCT/US2017/063756, dated Feb. 23, 2018.
International Search Report and Written Opinion for PCT Application No. PCT/US2021/051801, dated Jan. 3, 2022.
Notice of Allowance for Chinese Patent Application No. 20170038785.3, dated Jul. 13, 2022.
Notice of Allowance for U.S. Appl. No. 15/395,203, dated Apr. 10, 2018.
Notice of Allowance for U.S. Appl. No. 15/719,770, dated Jun. 17, 2021.
Notice of Allowance for U.S. Appl. No. 15/719,770, dated Mar. 1, 2021.
Notice of Allowance for U.S. Appl. No. 15/721,829, dated Jan. 22, 2021.
Notice of Allowance for U.S. Appl. No. 15/721,829, dated Sep. 11, 2020.
Notice of Allowance for U.S. Appl. No. 16/055,602, dated Feb. 13, 2020.
Notice of Allowance for U.S. Appl. No. 16/055,602, dated Oct. 28, 2019.
Notice of Allowance for U.S. Appl. No. 16/344,582, dated Jan. 12, 2021.
Notice of Allowance for U.S. Appl. No. 16/513,345, dated Jun. 5, 2020.
Notice of Allowance for U.S. Appl. No. 16/513,345, dated May 19, 2020.
Notice of Allowance for U.S. Appl. No. 16/513,371, dated Jan. 31, 2020.
Notice of Allowance for U.S. Appl. No. 16/513,371, dated Jun. 5, 2020.
Notice of Allowance for U.S. Appl. No. 16/513,371, dated May 20, 2020.
Notice of Allowance for U.S. Appl. No. 17/015,479, dated May 26, 2021.
Notice of Allowance for U.S. Appl. No. 17/246,388, dated Dec. 13, 2022.
Notice of Allowance for U.S. Appl. No. 17/404,749, dated Nov. 9, 2022.
Office Action for U.S. Appl. No. 15/396,014 dated Nov. 4, 2019.
Office Action for U.S. Appl. No. 15/395,203, dated Dec. 1, 2017.
Office Action for U.S. Appl. No. 15/396,014, dated May 10, 2022.
Office Action for U.S. Appl. No. 15/396,014, dated May 14, 2020.
Office Action for U.S. Appl. No. 15/396,014, dated Nov. 3, 2022.
Office Action for U.S. Appl. No. 15/719,770, dated Dec. 27, 2019.
Office Action for U.S. Appl. No. 15/721,829 dated Dec. 23, 2019.
Office Action for U.S. Appl. No. 15/721,829, dated May 13, 2020.
Office Action for U.S. Appl. No. 16/055,602 dated Mar. 27, 2019.
Office Action for U.S. Appl. No. 16/055,602, dated Aug. 15, 2019.
Office Action for U.S. Appl. No. 16/344,582, dated Jul. 22, 2020.
Office Action for U.S. Appl. No. 16/513,345, dated Jan. 31, 2020.
Office Action for U.S. Appl. No. 17/015,479, dated Feb. 12, 2021.
Office Action for U.S. Appl. No. 17/221,541, dated Oct. 25, 2022.
Office Action for U.S. Appl. No. 17/246,388, dated Jul. 21, 2022.
Office Action for U.S. Appl. No. 17/404,749, dated Jul. 27, 2022.
Summons to attend oral proceedings pursuant to Rule 115(1) for European Patent Application No. 18191345.0, dated Aug. 23, 2022.
Translation of Office Action and Search Report for Chinese Patent Application No. 201780038785.3, dated Feb. 18, 2022.
"Directory-Based Cache Coherence", Parallel Computer Architecture and Programming, CMU 15-418/15-618, Spring 2019.
"Secure In-Field Firmware Updates for MSP MCUs" , Texas Instruments, Application Report, Nov. 2015.
Artail, et al., "Speedy Cloud: Cloud Computing with Support for Hardware Acceleration Services", 2017 IEEE, pp. 850-865.
Asiatici, et al., "Virtualized Execution Runtime for FPGA Accelerators in the Cloud", 2017 IEEE, pp. 1900-1910.
Burdeniuk, et al., "An Event-Assisted Sequencer to Accelerate Matrix Algorithms", 2010 IEEE, pp. 158-163.
Caulfield, et al., "A Cloud-scale acceleration Architecture", Microsoft Corp., Oct. 2016, 13 pages.
Denneman, Frank, "Numa Deep Dive Part 3: Cache Coherency", https://frankdenneman.nl/2016/07/11/numa-deep-dive-part-3-cache-coherency/, Jul. 11, 2016.
Diamantopoulos, et al., "High-level Synthesizable Dataflow MapReduce Accelerator for FPGA-coupled Data Centers", 2015 IEEE, pp. 26-33.
Ding, et al., "A Unified OpenCL-flavor Programming Model with Scalable Hybrid Hardware Platform on FPGAs", 2014 IEEE, 7 pages.
Fahmy Suhaib, et al., "Virtualized FPGA Accelerators for Efficient Cloud Computing", 2015 IEEE 7th International Conference on Cloud Computing Technology and Science (Cloudcom), IEEE, Nov. 30, 2015, pp. 430-435.
Gorman, Mel, et al., "Optimizing Linux for AMD EPYC 7002 Series Processors with SUSE Linux Enterprise 15 SP1", SUSE Best Practices, Nov. 2019.
Ronciak, John A., et al., "Page-Flip Technology for use within the Linux Networking Stack", Proceedings of the Linux Symposium, vol. Two, Jul. 2004.
Shade, L.K., "Implementing Secure Remote Firmware Updates", Embedded Systems Conference Silicon Valley, 2011, May 2011.
Applicant Response to Notice of Improper Request for Corrected Filing Receipt for U.S. Appl. No. 18/103,739, dated Feb. 24, 2023.
USPTO Notice of Improper Request for Corrected Filing Receipt for U.S. Appl. No. 18/103,739 dated Feb. 24, 2023.
Office Action for U.S. Appl. No. 17/221,541, dated Mar. 15, 2023.
Office Action from European Patent Application No. 20217841.4 dated May 25, 2023, 9 pgs.
Non-Final Office Action from U.S. Appl. No. 17/221,541 dated Aug. 1, 2023, 15 pgs.
Non-Final Office Action from U.S. Appl. No. 17/681,025 dated Jun. 23, 2023, 8 pgs.
Non-Final Office Action from U.S. Appl. No. 18/103,739 dated Jun. 29, 2023, 11 pgs.
Office Action from Chinese Patent Application No. 202110060921.7 dated Sep. 11, 2023, 5 pgs.
Final Office Action from U.S. Appl. No. 17/125,420 notified Oct. 13, 2023, 19 pgs.

(56) References Cited

OTHER PUBLICATIONS

Non-Final Office Action from U.S. Appl. No. 18/076,104 notified Dec. 12, 2023, 11 pgs.
Notice of Allowance from U.S. Appl. No. 17/125,420 notified Jan. 10, 2024, 14 pgs.
Notice of Allowance from U.S. Appl. No. 17/681,025 notified Oct. 17, 2023, 14 pgs.
Final Office Action from U.S. Appl. No. 17/221,541 notified Jan. 17, 2024, 21 pgs.
Notice of Allowance from Chinese Patent Application No. 202110060921.7 notified Feb. 23, 2024, 8 pgs.
Notice of Allowance from U.S. Appl. No. 18/076,104 notified Mar. 26, 2024, 12 pgs.
Notice of Allowance from U.S. Appl. No. 18/103,739 notified Jan. 18, 2024, 12 pgs.
Office Action from Chinese Patent Application No. 201811004538.4 notified Dec. 25, 2023, 11 pgs.
Office Action from Chinese Patent Application No. 201811006541.X notified Dec. 6, 2023, 10 pgs.

* cited by examiner

Sled 1304

1400

1700

> DETERMINE AN ACCESS LEVEL OF OPERATION BASED ON AN INDICATION RECEIVED FROM A POD MANAGEMENT CONTROLLER
>
> 1705

> ENABLE OR DISABLE A FIRMWARE UPDATE CAPABILITY FOR A FIRMWARE DEVICE BASED ON THE ACCESS LEVEL OF OPERATION, THE FIRMWARE UPDATE CAPABILITY TO CHANGE FIRMWARE FOR THE FIRMWARE DEVICE
>
> 1710

FIG. 17

TECHNIQUES TO CONTROL SYSTEM UPDATES AND CONFIGURATION CHANGES VIA THE CLOUD

RELATED CASES

This application is a continuation of prior co-pending U.S. patent application Ser. No. 15/396,014, filed Dec. 30, 2016, entitled "Techniques To Control System Updates And Configuration Changes Via The Cloud", which claims the benefit of and priority to prior U.S. Provisional Patent Application No. 62/365,969, filed Jul. 22, 2016, prior U.S. Provisional Patent Application No. 62/376,859, filed Aug. 18, 2016, and prior U.S. Provisional Patent Application No. 62/427,268, filed Nov. 29, 2016. Each of these prior U.S. Patent Applications is hereby incorporated herein by reference in its entirety.

TECHNICAL FIELD

Embodiments described herein generally include performing circuit switching for workloads.

BACKGROUND

A computing data center may include one or more computing systems including a plurality of compute nodes that may include various compute structures (e.g., servers or sleds) and may be physically located on multiple racks. The sleds may include a number of physical resources interconnected via one or more compute structures and buses. Typically, a computing data center and components therein may require updating and configuration changes to fix potential problems and to provide physical resources in a desirable configuration for the users. However, current solutions may permit users to make updates and configuration changes in such a way that may be harmful to the data center, either intentionally or unintentionally. Thus, embodiments may address these and other issues as discussed herein.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 17 illustrates an example of a third logic flow diagram.

DETAILED DESCRIPTION

Figure 1:
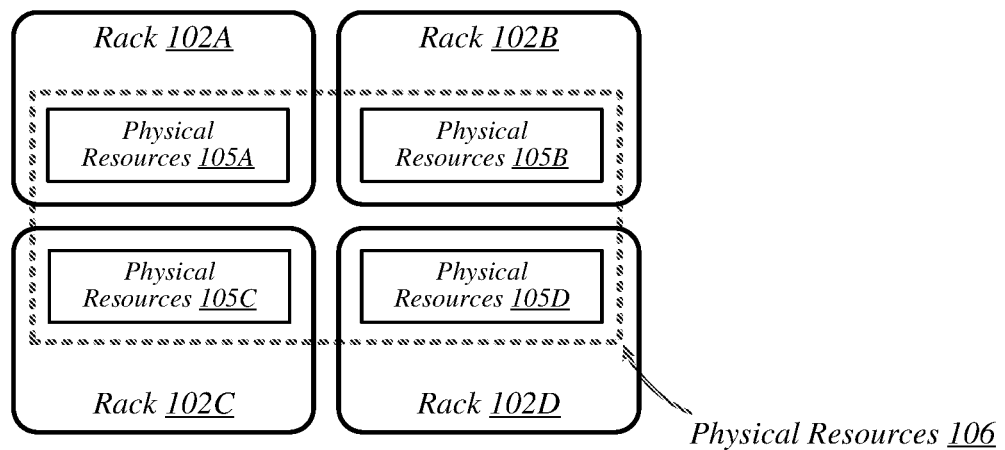
FIG. 1 illustrates an example of a data center.

Various embodiments may generally be directed to controlling update and configuration capabilities that may be utilized in a cloud-based system. For example, embodiments may include determining an access level of operation for a user or administrator attempting to change or update a sled, including sleds that are capable of providing physical compute resources, physical memory resources, physical accelerator resources, physical storage resources, and so forth. The access level of operation may be utilized to determine whether the administrator or user has permission to make the changes or updates they are requesting. In some embodiments, the access level of operation may be a priority level and circuitry may determine whether a user or administrator is permitted to update a firmware device or change configuration settings based on the priority level, for example. Based on the access level of operation a firmware update capability may be enabled or disabled, one or more configuration settings may be enabled or disabled for changing, and so forth. These and other details will become apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D.

Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local.

The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks.

Figure 2:
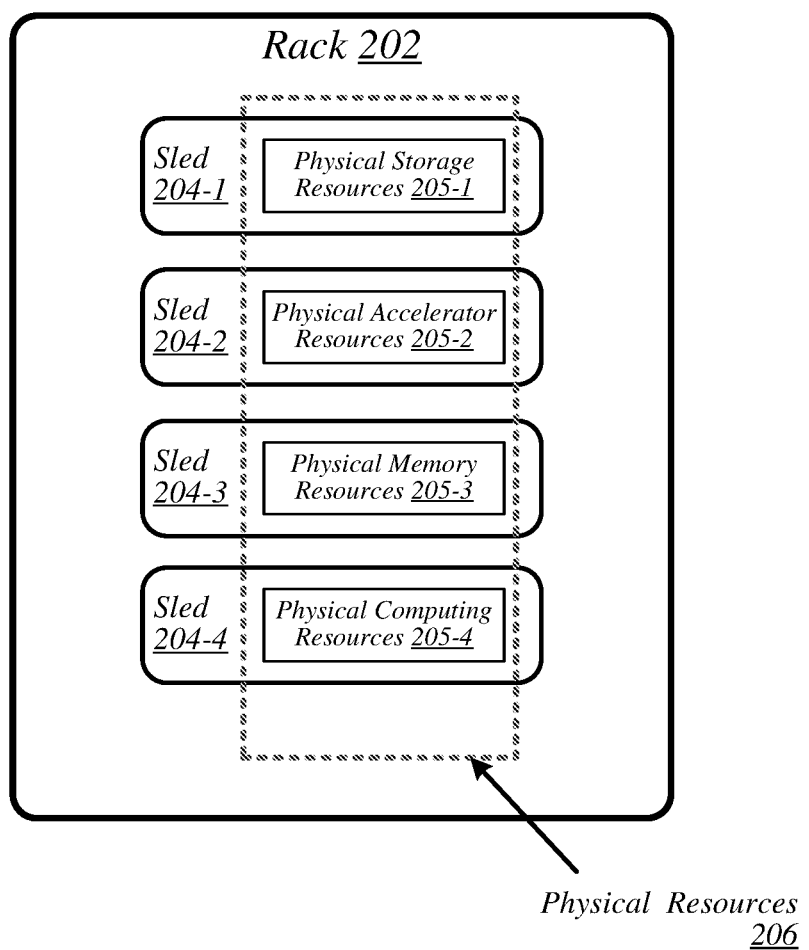
FIG. 2 illustrates an example of a rack.

For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
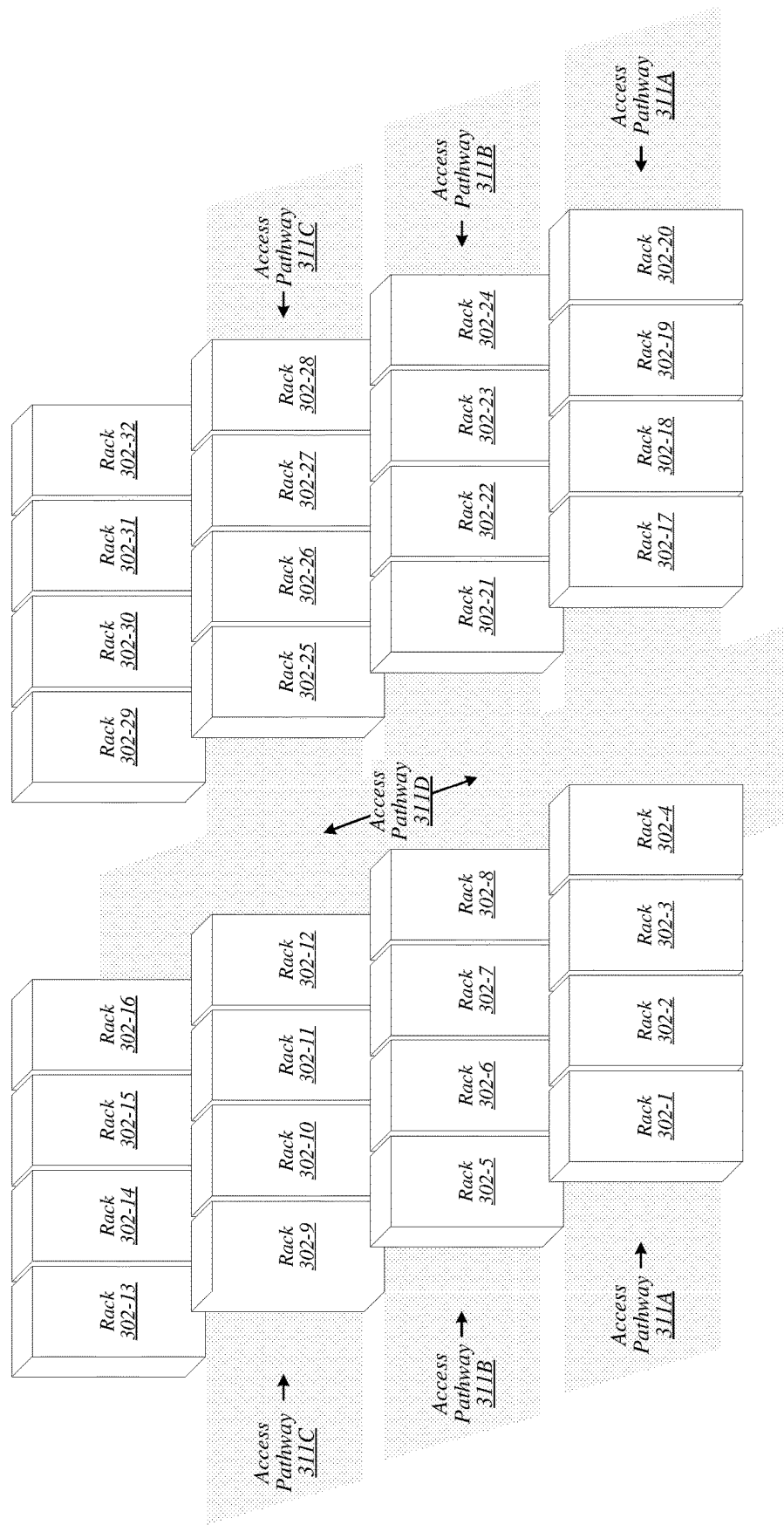
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
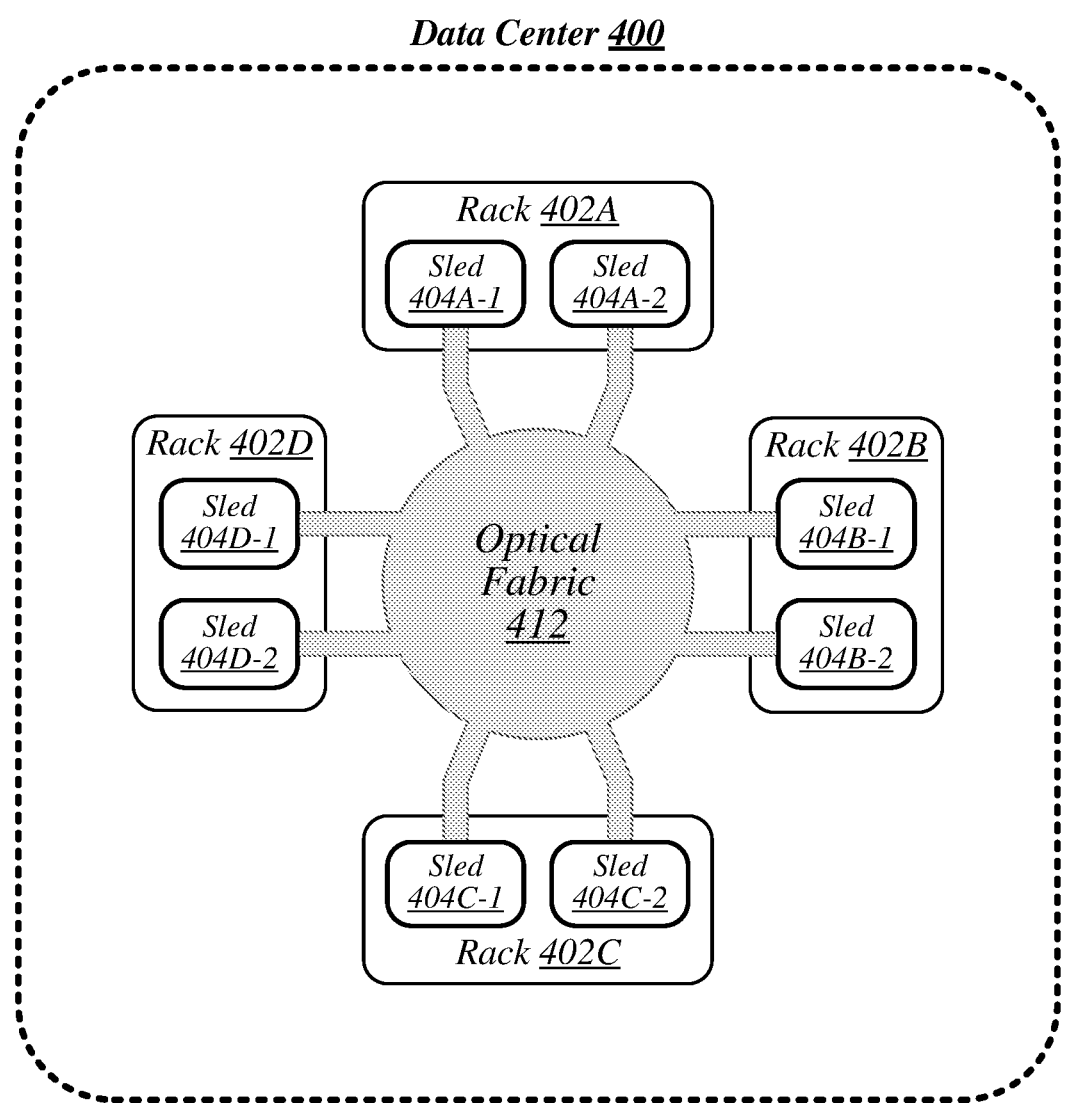
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
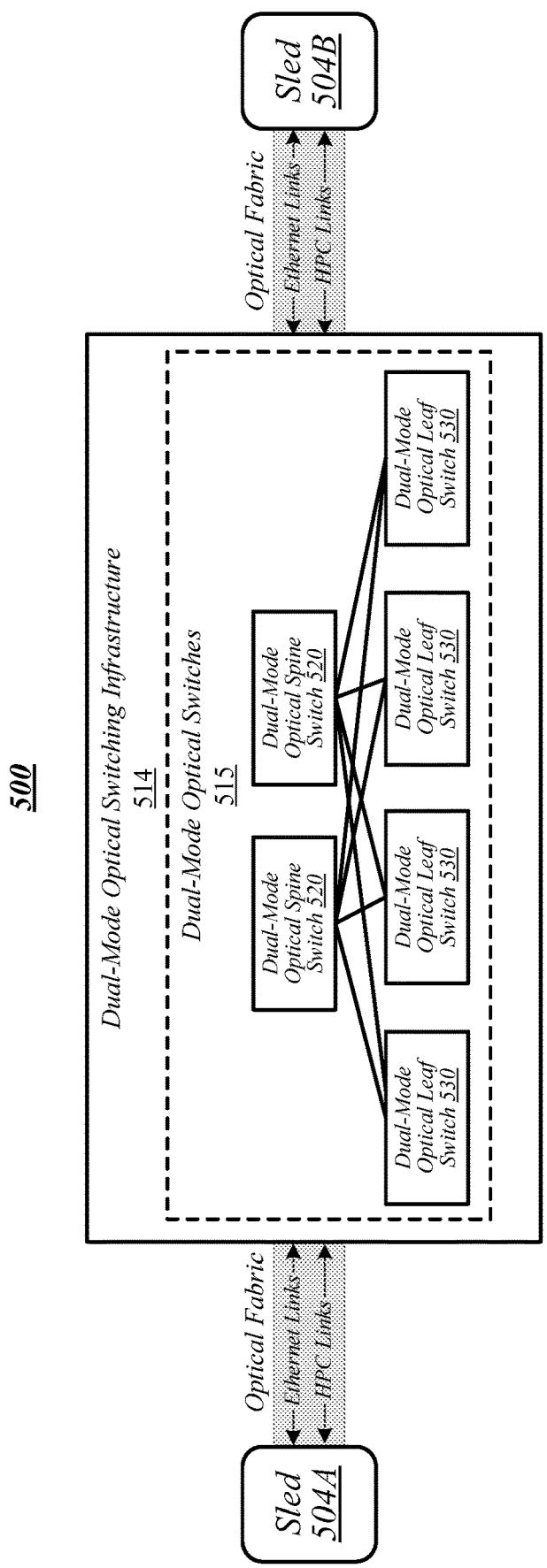
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multiply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Omni-Path communication, which may be auto-detected by the dual-mode optical switch 515 or configured by the Pod management controller. This allows for the same network to be used for Cloud traffic (Ethernet) or High Performance Computing (HPC), typically Omni-Path or Infiniband.

Moreover, and in some instances, an Omni-Path protocol may carry Omni-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
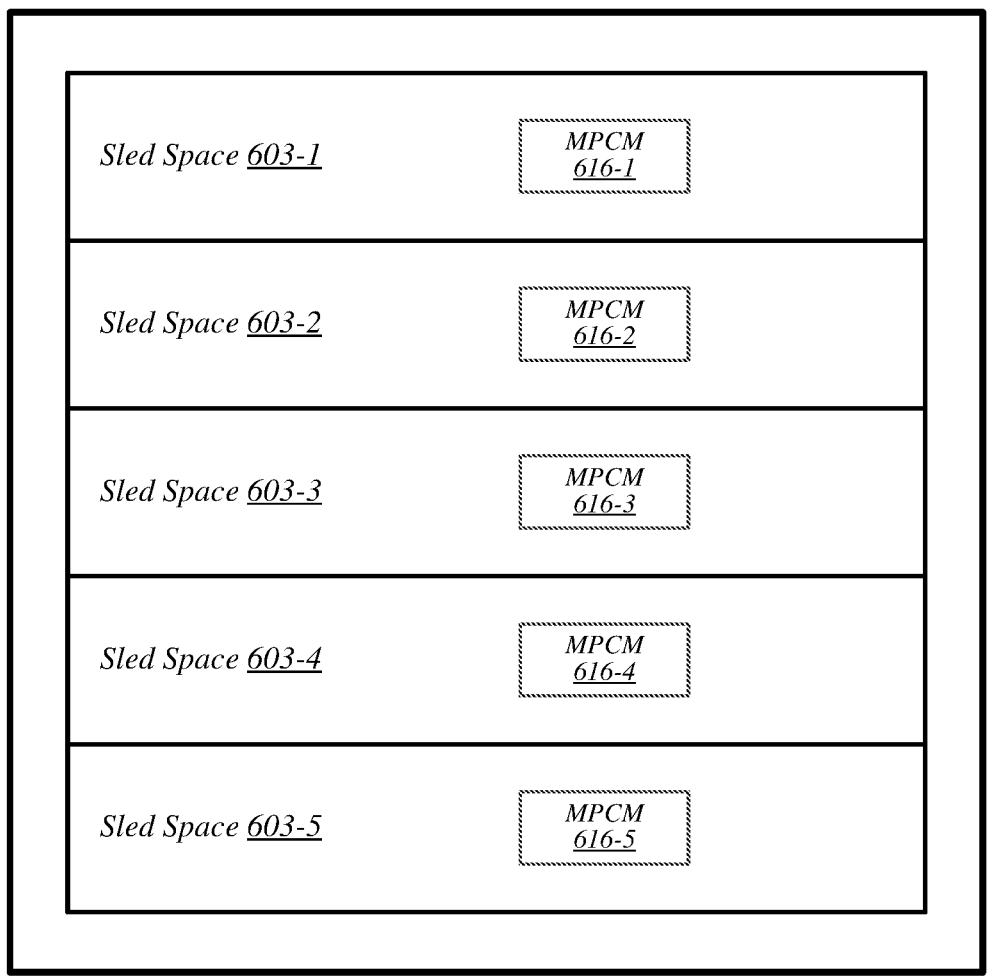
FIG. 6 illustrates an example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
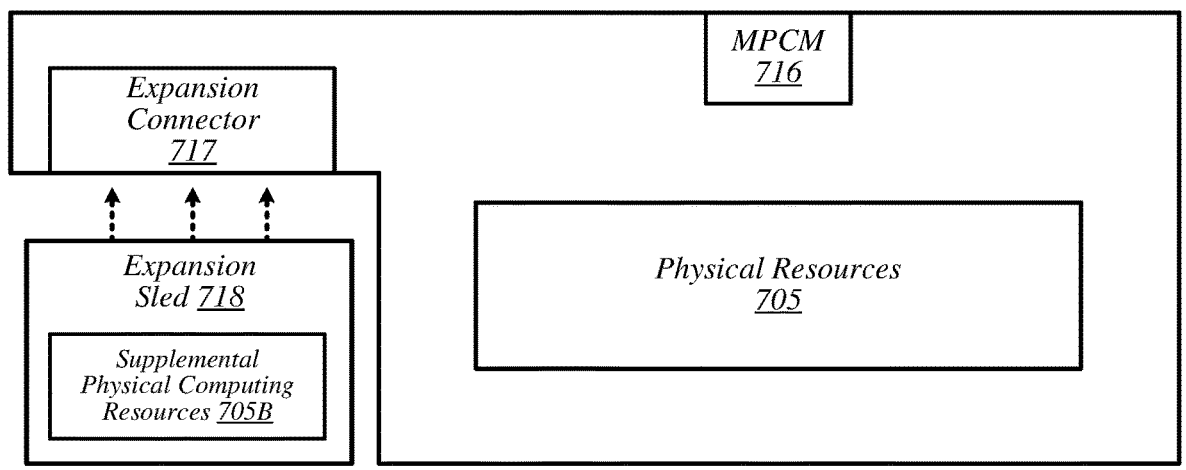
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
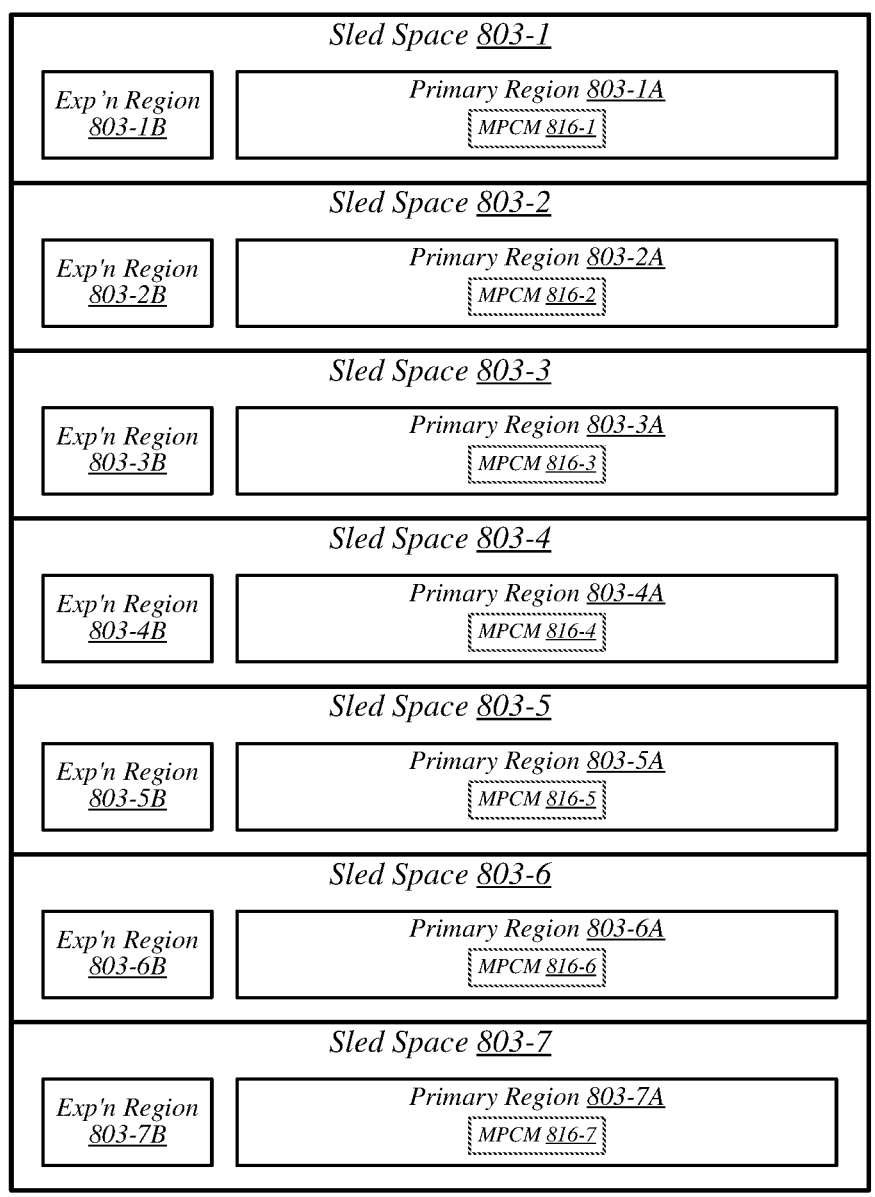
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
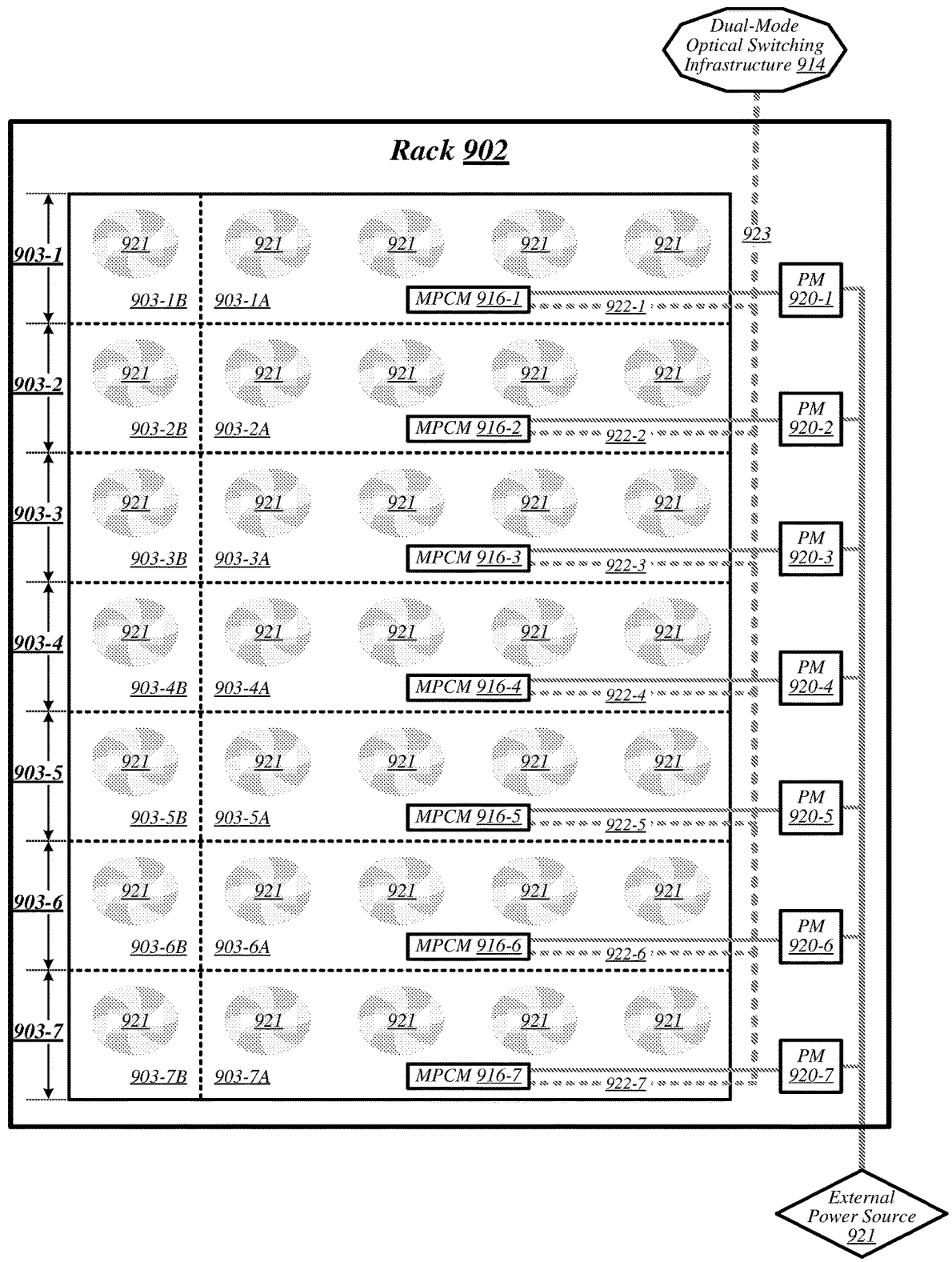
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
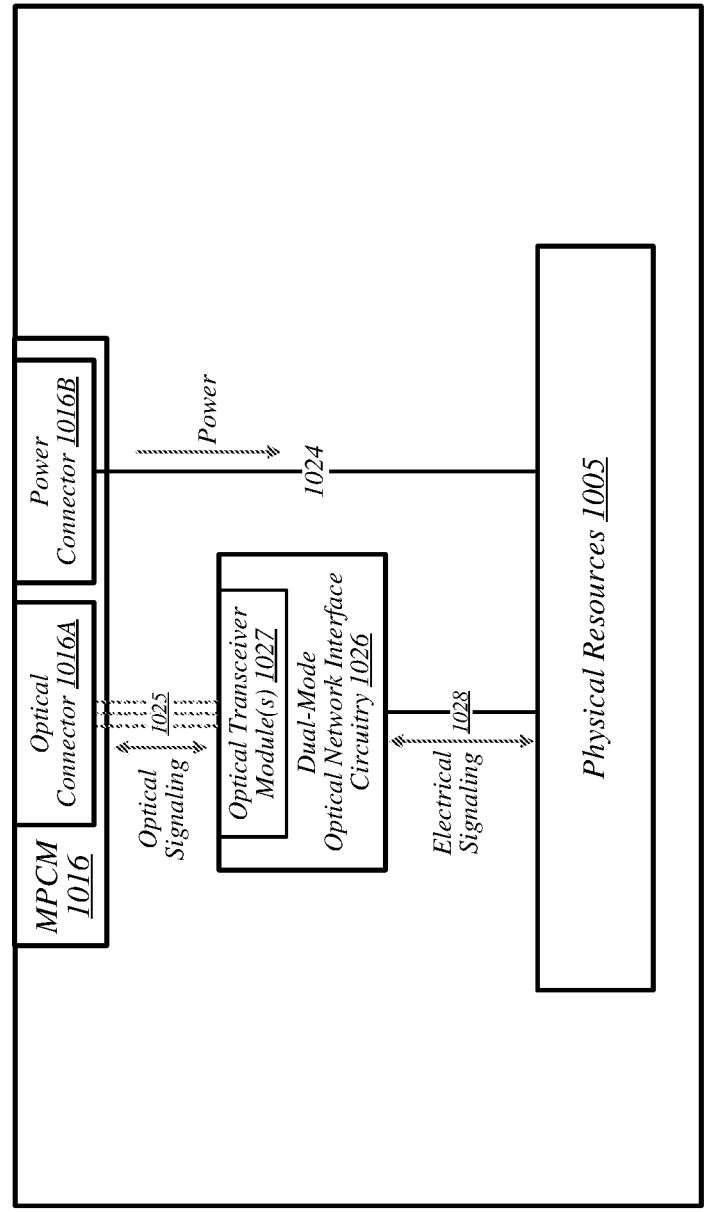
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
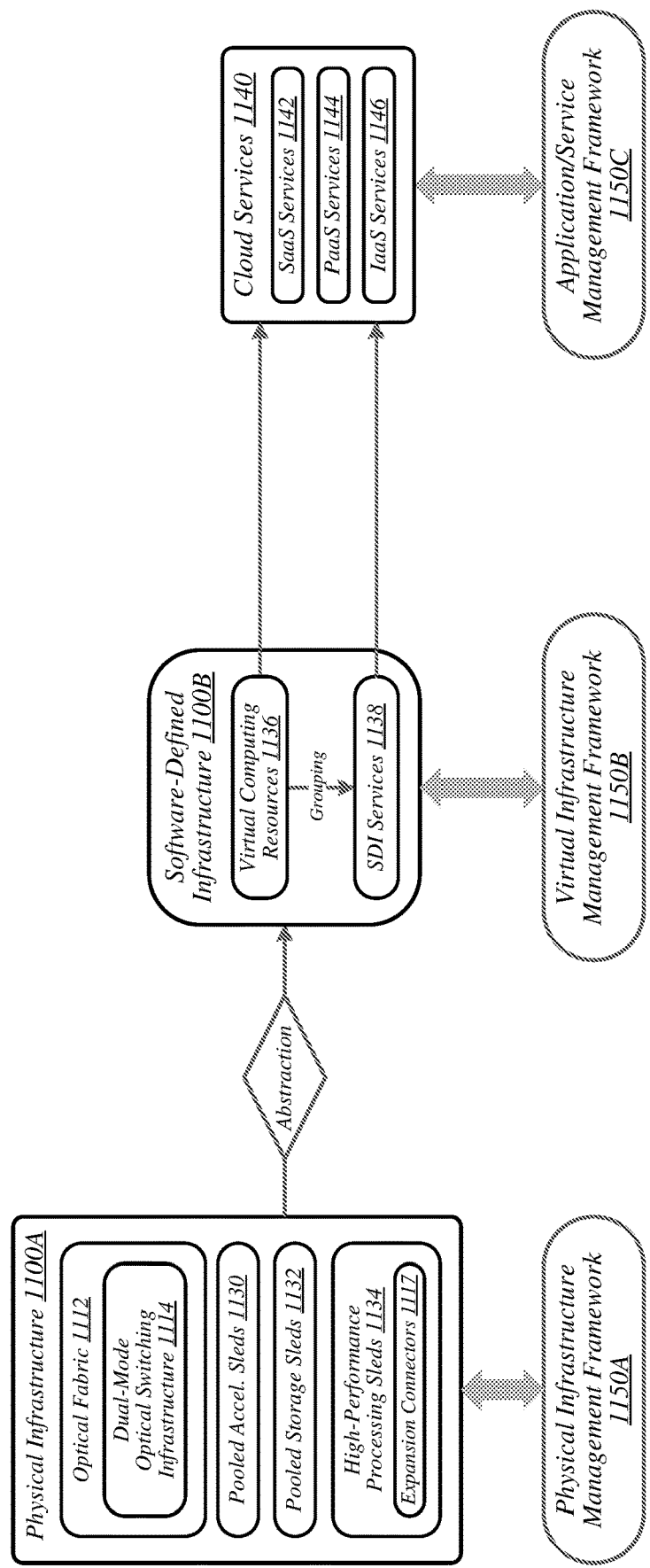
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
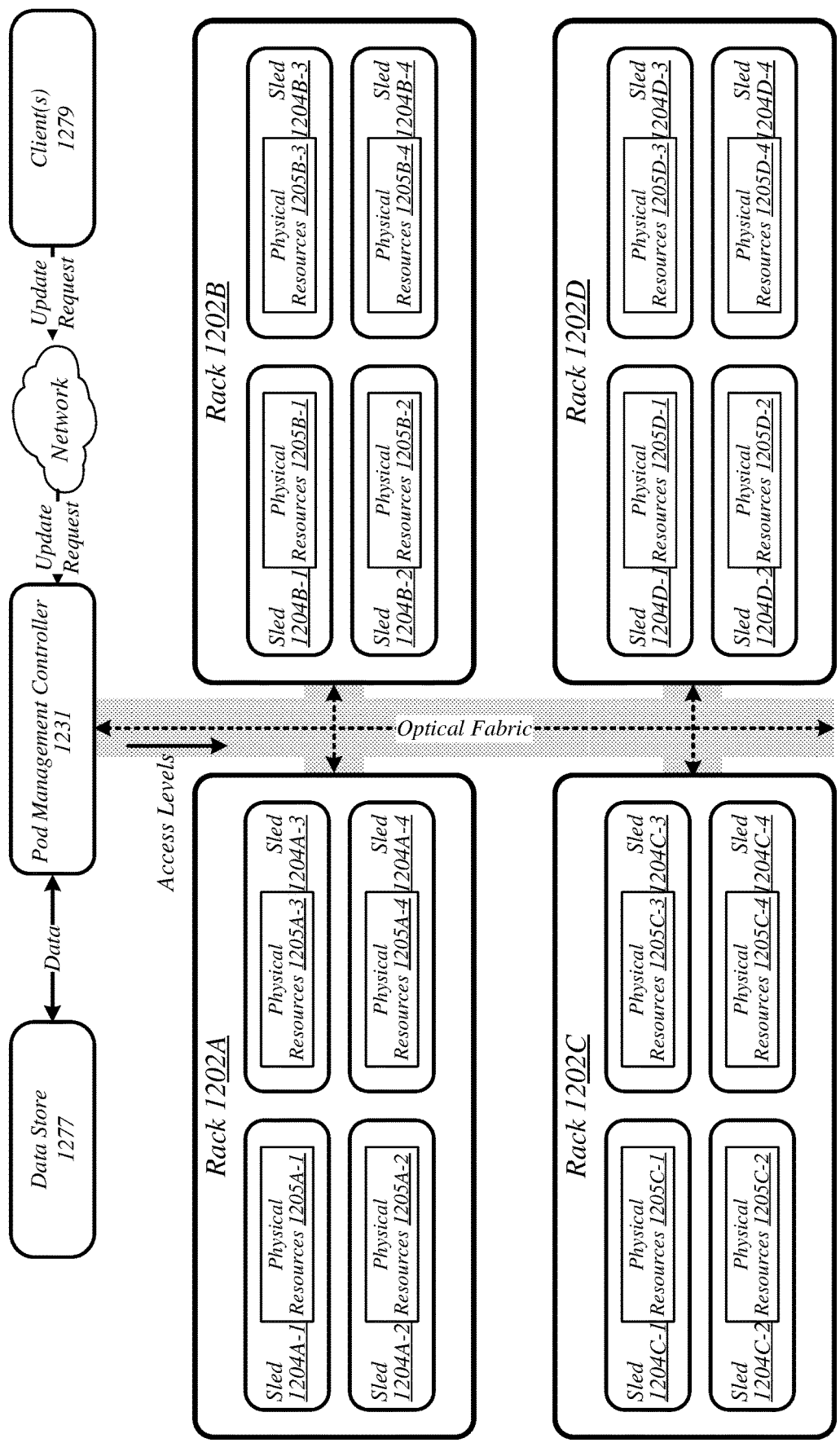
FIG. 12 illustrates an example of a data center.

FIG. 12 illustrates an example of a data center 1200 that may generally be representative of a data center or other type of computing network in/for which one or more techniques described herein may be implemented according to various embodiments. As shown in FIG. 12, the data center 1200 may be similar to and include features and components previously discussed. For example, the data center 1200 may generally contain a plurality of racks 1202A to 1202D, each of which may house computing equipment including a respective set of physical resources 1205A-x to 1205D-x, where x may be any positive integer from 1 to 4. The physical resources 1205 may be contained within a number of sleds 1204A through 1204D. As mentioned, the physical resources 1205 may include resources of multiple types, such as—for example—processors, co-processors, field-programmable gate arrays (FPGAs), memory, accelerators, and storage. Moreover, the physical resources 1205 may be physical memory resources, physical compute resources, physical storage resources, physical accelerator resources, etc.

In embodiments, the physical resources 1205 may be pooled within racks and between racks. For example, physical resources 1205A-1 of sled 1204A-1 may be pooled with physical resources 1205A-3 of sled 1204A-3 to provide combined processing capabilities for workloads across sleds within the same rack, e.g. rack 1202A. Similarly, physical resources of one or more racks may be combined with physical resources of one or more other racks to create a pool of physical resources to process a workload. In one example, the physical resources 1205A-3 may be combined and pooled with physical resources of 1205B-1, which are located within rack 1202A and rack 102B, respectively. Any combination of physical resources 1205 may be pooled to process a workload and embodiments are not limited in this manner. Moreover, some embodiments may include more or less physical resources 1205, sleds 1204, and racks 1202 and the illustrated example should not be construed in a limiting manner.

In the illustrated example of FIG. 12, the data center 1200 may provide control and management functionality for the sleds 1204 via cloud-based components, such as the pod management controller 1231. The control and management functionality may include controlling updates and configurations settings by the pod management controller 1231 based on access levels of operation. For example, the pod management controller 1231 may receive update requests from one or more users accessing the data center 1200, via a client 1279. Theses update requests may be requested to update the firmware, change a configuration setting or a basic input/output system (BIOS) setting, and so forth. The pod management controller 1231 may determine an access level of operation for a user invoking an update request based an identification of the user, utilizing an identification scheme, e.g. a provided username and password. The pod management controller 1231 can use the identification to perform a lookup in a database, such as data store 1277, to determine an access level of operation for the user, for example.

In embodiments, the pod management controller 1231 may communicate, an access level of operation to a sled or component attempted to be accessed by a user, and circuitry may determine whether to permit the user to perform an operation, such as a firmware update or change a configuration setting based on the access level operation. In some instances, the circuitry may determine which configuration settings a user may be permitted to change based on the access level of operation and enable changing of those settings. The updates and setting changes may be applied to hardware and software elements of a sled 1204, as will be discussed in more detail below.

The pod management controller 1231 may provide the access level of operation in various forms. For example, the access level of operation may be specific and specify which hardware components a user is permitted to update and which configuration settings the user is permitted to change. In other instances, the access level of operation may be a priority level, such as a high priority level, a middle priority level, and a low priority. The circuitry may determine permissions to make changes based on these priority levels. For example, a user having a higher priority access level of operation may be permitted to change more hardware and software configuration settings and apply firmware updates, than a user having a lower priority access level of operation. In some instances, a user having a low priority access level of operation may not be permitted to make any changes. Embodiments are not limited in this manner.

In some embodiments, the priority level for the access level of operation may be an indication on a scale from x to y, such as 1 to 10, where the settings available to a user to change and the updates a user may make are dependent on the indication of the access level of operation. For example, a user associated with a one (1) access level of operation may not be able to change any settings nor update any firmware. By contrast, a user associated with a ten (10) access level of operation may be able to change every setting and update any firmware. The changes and updates a user is permitted to make may be dependent on the access level of operation indication. Generally, as the indication of the access level of operation gets higher, the more changes and updates a user can make, and vice versa. Note that embodiments are not limited to the above example, and in some instances, a lower number, such as one (1), may indicate that the user is permitted to change all of the settings and make all of the updates. While a higher number, such as ten (10) may indicate that a user is not permitted to make any changes and updates.

In some embodiments, the access level of operation may provide an indication of a user type. For example, the access level of operation may indicate that an administrator is attempting to make changes to the data center and sled 1204. In another example, the access level of operation may indicate that a user may be attempting to make changes to the data center and sled 1204. Moreover and in some instances, an administrator or user may have various levels of access as previously discussed. For example, the access level of operation may indicate a user is attempting to make changes and provide an indication of a priority level associated with the user. Embodiments are not limited by granularity for which a user or administrator may be associated with an access level of operation. Each user and administrator may have their own access level of operation, which may or may not be the same as another user or administrator.

The pod management controller 1231 may provide other functionality and control including determining physical resources 1205 to process workloads. These determinations may be based on service level agreement requirements, the physical resources 1205, and other factors, such as location, network configurations, and so forth. To determine which physical resources 1205 are to process one or more tasks of the workload and a configuration of for the physical resources 1205. The pod management controller 1231 may distribute or cause the distribution of the workloads communicated to the appropriate sleds 1204 via one or more networks, such as an optical fiber network. In some instances, the workload may go through the pod management controller 1231. However, embodiments are not limited in this manner and some instances; the workload may be sent directly from a client 1279 to the appropriate sled 1204.

As mentioned, the pod management controller 1231 may provide one or more indications of access levels of operation to a sled 1204. The sled 1204 may receive the one or more indications and enable or disable configurations settings and firmware updates based on an access level of operation. For example, the sled 1204 may enable or disable a firmware update capability to update or change firmware for a firmware device. In another example, the sled 1204 may enable or disable particular BIOS settings for change based on an access level of operation. These and other details will become more apparent in the following description.

Figure 13:
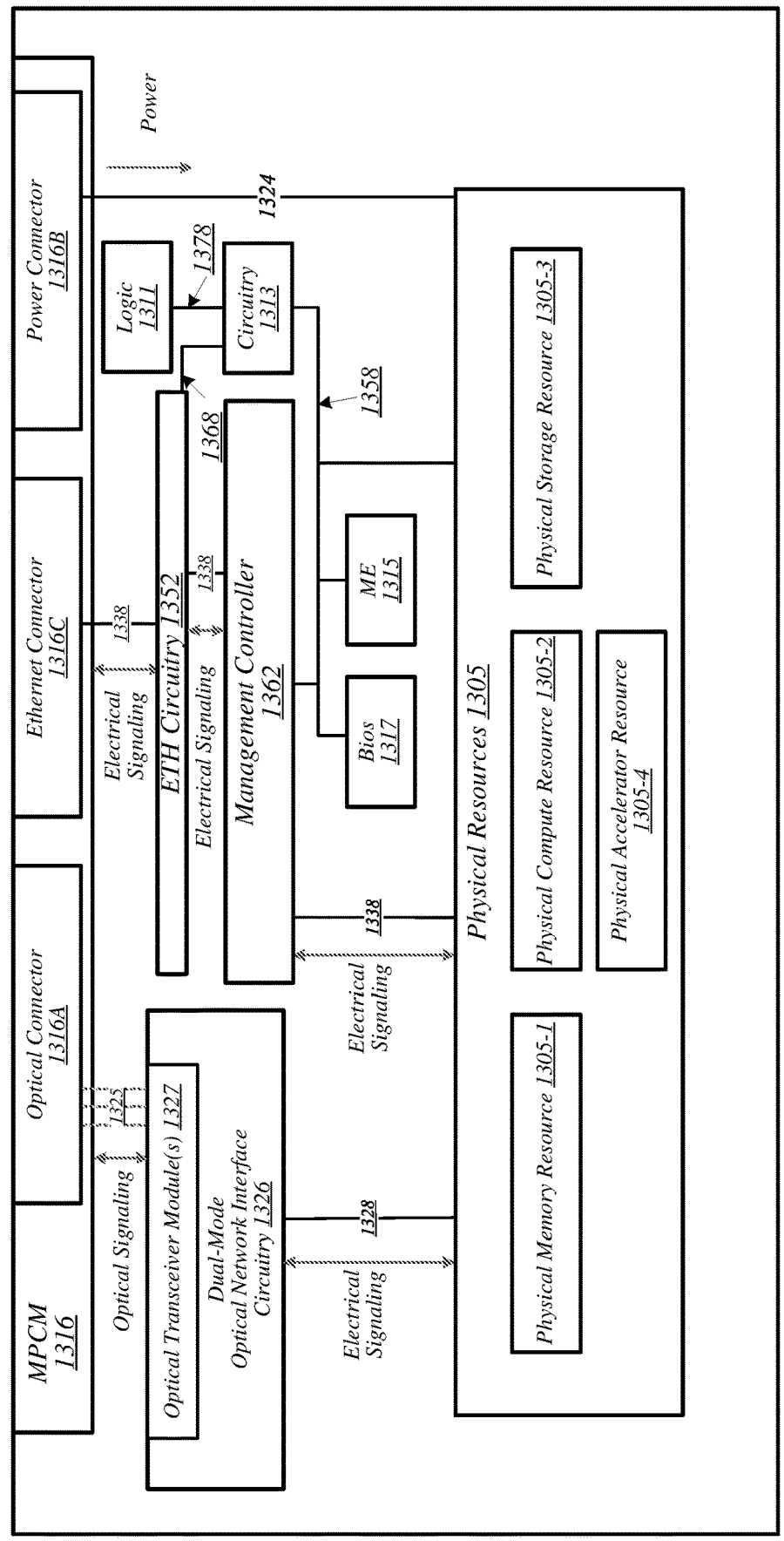
FIG. 13 illustrates an example of a sled.

FIG. 13 illustrates an example of a sled 1304 that may be representative of a sled designed for use in conjunction with the racks discussed herein, for example. In embodiments, sled 1304 may be similar to and have similar components and functionality as sled 1004 discussed in FIG. 13. Sled 1304 may feature an MPCM 1316 that which may include an optical connector 1316A, a power connector 1316B, and an ETH connector 1316C, and that is designed to couple with a counterpart MPCM of a sled space in conjunction with insertion of MPCM 1316 into that sled space. Coupling MPCM 1316 with such a counterpart MPCM may cause power connector 1316B to couple with a power connector comprised in the counterpart MPCM. This may enable physical resources 1305 of sled 1304 to source power from an external source, via power connector 1316B and power transmission media 1324 that conductively couples power connector 1316 to physical resources 1305.

Sled 1304 may also include dual-mode optical network interface circuitry 1326. Dual-mode optical network interface circuitry 1326 may include circuitry that is capable of communicating over optical signaling media according to each of multiple link-layer protocols supported by dual-mode optical switching infrastructure, as previously discussed in FIGS. 9 and 10. In some embodiments, dual-mode optical network interface circuitry 1326 may be capable both of Ethernet protocol communications and of communications according to a second, high-performance protocol. In various embodiments, dual-mode optical network interface circuitry 1326 may include one or more optical transceiver modules 1327, each of which may be capable of transmitting and receiving optical signals over each of one or more optical channels. The embodiments are not limited in this context.

Coupling MPCM 1316 with a counterpart MPCM of a sled space in a given rack may cause optical connector 1316A to couple with an optical connector comprised in the counterpart MPCM. This may generally establish optical connectivity between optical cabling of the sled and dual-mode optical network interface circuitry 1326, via each of a set of optical channels 1325. Dual-mode optical network interface circuitry 1326 may communicate with the physical resources 1305 of sled 1304 via electrical signaling media 1328.

The sled 1304 may also include a management controller 1362, which may be capable of performing management functions for the sled 1304 and the physical resources 1305. For example, the management controller 1362 provides management functionality including sending metric data to a pod management controller or rack management controller. In some instances, the management controller 1362 may utilize an Intelligent Platform Management Interface (IPMI) architecture or Redfish architecture and may be a baseboard management controller (BMC), Redfish interface, Innovation Engine (IE), Manageability engine (ME) or specialized service processor that monitors the physical state and operational state of the physical resources 1305. In some instances, the management controller 1362 may be a sled management controller. Embodiments are not limited in this manner.

The sled 1304 may also include physical resources 1305, including but not limited to, physical memory resources 1305-1, physical compute resources 1305-2, physical storage resources 1305-3, and physical accelerator resources 1305-4. Examples of a physical memory resource 1305-1 may be any type of memory, such as any machine-readable or computer-readable media capable of storing data, including both volatile and non-volatile memory. In some embodiments, the machine-readable or computer-readable medium may include a non-transitory medium. Moreover, physical memory resource 1305-1 may include in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. Embodiments are not limited to these examples.

Examples of a physical compute resource 1305-2 may be any type of circuitry capable of processing information. Moreover, a physical compute resources 1305-2 may be implemented using any processor or logic device. The physical compute resource 1305-2 may be one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The physical compute resource 1305-2 may be connected to and communicate with the other physical resources 1305 of the computing system via an interconnect, such as one or more buses, control lines, and data lines.

In embodiments, a physical storage resource 1305-3 may be any type of storage, and may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, a physical storage resource 1305-3 may include technology to increase the storage performance enhanced protection for valuable digital media when multiple hard drives are included, for example. Further examples of physical storage resource 1305-3 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

A physical accelerator resource 1305-4 may be any type of accelerator device designed to increase processing power of a processor, such as the physical compute resource 1305-2. The physical accelerator resource 1305-4 accelerates transmission or processing beyond processor capabilities. In one example, a physical accelerator resource 1305-4 may compute faster floating-point units (FPUs) by assisting in math calculations or by increasing speed. In another example, the physical accelerator resource 1305-4 may be a graphics processing units (GPUs) for 3-D images or faster graphic displays.

Embodiments, the physical accelerator resource 1305-4 may be implemented as field programmable gate arrays (FPGAs); however, embodiments are not limited in this manner.

In embodiments, the sled 1304 may also include processing circuitry 1313 capable of executing one or more instructions, such as logic 1311, stored in memory. The instructions may determine access levels of operation for one or more users and to enable and disable firmware updates and configuration settings based on the access levels of operations. The logic 1311 may be code stored in non-volatile memory. The instructions may be communicated via one or more interconnects 1378 between the logic 1311 and the processing circuitry 1313 for execution, for example. Note that FIG. 13 illustrates processing circuitry 1313 and logic 1311 being separate and standalone components; however, embodiments are not limited in this manner. For example, one or more of the processing circuitry 1313 and logic 1311 may be implemented in another component, such as the management controller 1362 or a physical compute resource 1305-2. The processing circuitry 1313 and logic 1311 may also be implemented as part of the same component. In some instances, the processing circuitry 1313 may be implemented in a computer processing unit. However, embodiments are not limited in this manner.

In some instances, the processing circuitry 1313 may receive an indication of an access level of operation for a user from a pod management controller or another device in a cloud computing environment. Moreover, a pod management controller may send an access level of operation associated with a user via one or more network links coupled with Ethernet (ETH) connector 1316C and ETH circuitry 1352. In some instances, the access levels of operation may be provided to the processing circuitry 1313 via an out-of-band network coupled with the ETH connector 1316C and ETH circuitry 1352 and interconnect 1338 and 1368. However, embodiments are not limited in this manner, and the access levels of operation may be provided to the processing circuitry 1313 via an optical network coupled with optical connect 1316A and dual-mode optical network interface circuitry 1326, for example.

As mentioned, the processing circuitry 1313 may enable or disable a firmware update capability for a firmware device of the sled 1304 based on an access level of operation. For example, the access level of operation may be an administrative access level of operation, and a user may be enabled to change the firmware of a firmware device. In another example, the access level of operation may be a user level of operation and the firmware update capability may be disabled such that the firmware of a firmware device cannot be updated or changed. In some embodiments, certain user levels of operation may be enabled to update firmware, e.g. a user level of operation having a higher priority level.

In embodiments, a firmware update capability updates or changes firmware for the firmware device, which may include copying one or more firmware instructions into the firmware device or a memory of a firmware device. The firmware device may be included or part of any of the components of the sled 1304, such as the management controller 1362, the BIOS 1317, a manageability engine (ME) 1315, a physical memory resource 1305-1, a physical compute resource 1305-2, a physical storage resource 1305-3, a physical accelerator resource 1305-4, ETH circuitry 1352, dual mode optical network interface circuitry 1326, and other components such as an innovation engine, and so forth.

In embodiments, the processing circuitry 1313 may disable the firmware update capability by routing or intercepting the system management interrupt (SMI) code. More specifically, the processing circuitry 1313 may block the interrupt to prevent the sled 1304 to prevent the update of a firmware device. Alternatively, the processing circuitry 1313 may permit the interrupt to enable the firmware update capability. Thus, when the interrupt fires or is invoked, the sled 1304 enters the system management mode, and the firmware device may be updated. This method may be utilized for devices typically receiving an in-band firmware update, such as the BIOS 1317, the ME 1315, management controller 1362, and ETH circuitry 1352.

The processing circuitry 1313 may disable and enable firmware update capabilities for other devices, such as in add-in components, by causing the BIOS 1317 to communicate information via a system management bus (SMBUS) or an in-band communication link, such as interconnects 1358, to the firmware device. For example, the processing circuitry 1313 may cause the BIOS 1317 to communicate disable firmware update capability information to the firmware device to disable the firmware update capability. In another example, the processing circuitry 1313 may cause the BIOS 1317 to communicate enable firmware update capability information via the SMBUS or the in-band communication link to the firmware device to enable the firmware update capability. The firmware update capability information may be consumed by the SMBUS mechanism or in-band mechanism of the firmware device. Once the update firmware information is set, the add-in component may not allow reconfiguration or firmware updates until a reset or privileged software (SMI or BMC OOB access) is entered. An add-in component may include a physical memory resource 1305-1, such as a memory module including Intel's® 3D XPoint® dual in-line memory module (DIMM). Another example of an add-in component may include a physical storage resource 1305-3, such as a solid state drive (SSD). Embodiments are not limited to these examples.

In embodiments, the processing circuitry 1313 may also control BIOS settings for the sled 1304. More specifically, the processing circuitry 1313 may determine which BIOS settings a user can change or configure based on the access level of operation for the user. In one example, the processing circuitry 1313 may enable all of the BIOS settings for configuration for the BIOS 1317 when the access level of operation is an administrative access level of operation. In another example, the processing circuitry 1313 may enable more BIOS settings for configuration for higher priority access levels of operation than lower priority access levels of operation. In some embodiments, the processing circuitry 1313 may enable an administrator to pick which BIOS settings are available for configuration for each access level of operation. Thus, the system is highly configurable and different users may be presented with their set of BIOS settings for configuration based on the picks made by the administrator.

In embodiments, the processing circuitry 1313 may enable more than one user or administrator to set one or more BIOS settings on the same system or sled 1304 operating at the same time. For example, a user or administrator may be presented or enabled to change BIOS settings in a virtual environment, such as one provided by a virtual machine operating on a virtual machine monitor (VMM), e.g. Hypervisor. Thus, a user accessing a sled 1304 via a client may configure one or more BIOS settings based on an access level of operation in a virtual machine environment. On the same sled 1304, a different user accessing the sled 1304 via a client may configure one or more BIOS settings in a different virtual machine environment. Since the BIOS settings are set in the virtual machine environments, they will not interfere with each other. The BIOS settings may be set differently in different virtual machine environments on the same sled 1304. In one example, a first user may set a specific operating frequency for a virtual machine presented to the first user and a second user may set a different operating frequency for a virtual machine presented to the second user. In another example, the access level of operation may be used to determine which user may change settings over other users on the same sled in different virtual environment. For example, a user having a higher access level of operation (more privileged) may set hyper threading on or off for the sled and other users in the different environment will be affect, but cannot change the setting. Embodiments are not limited to controlling BIOS settings based on an access level of operation. Other settings may be configurable or not configurable based on the access level of operation of a user.

Figure 14:
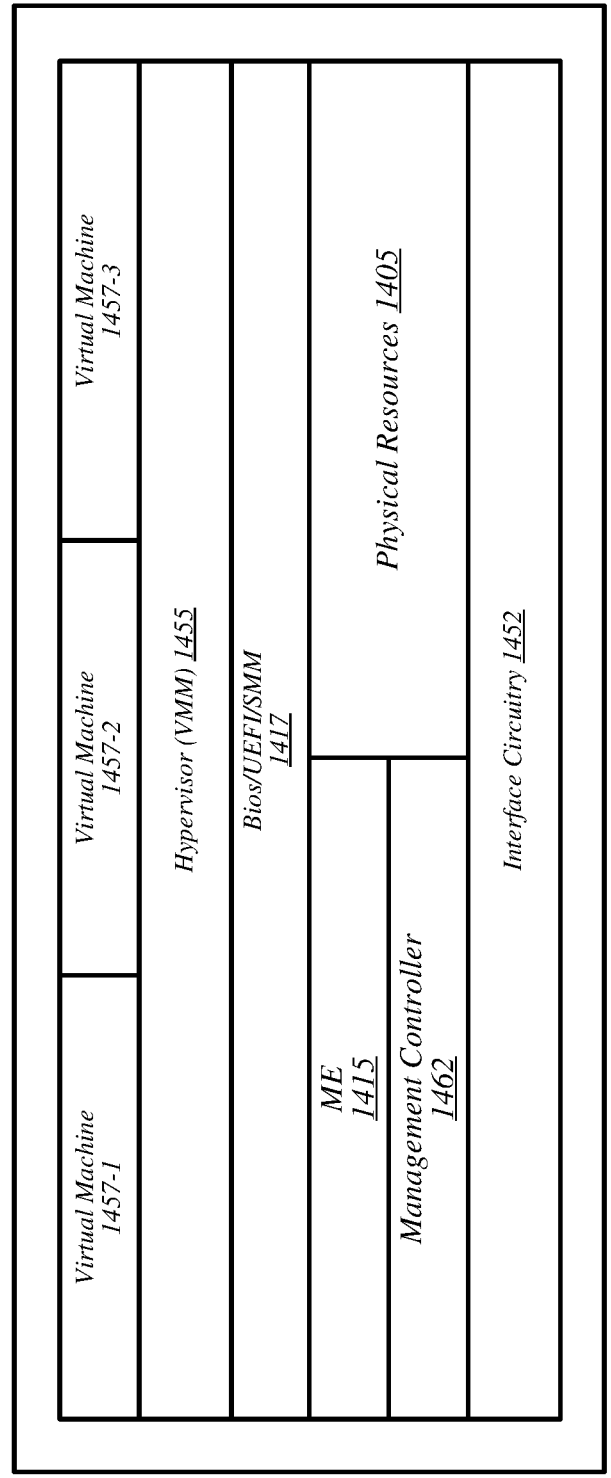
FIG. 14 illustrates an example of a functional block diagram.

FIG. 14 illustrates an example functional block diagram 1400 of components for controlling system updates and settings. The functional block diagram 1400 may represent and include components of a sled, such as a sled 1304 of FIG. 13. The components of functional block diagram 1400 may be implemented in hardware only, software only, or a combination thereof.

In the illustrated example, the functional block diagram 1400 includes interface circuitry 1452, which may include ETH circuitry and dual-mode optical network interface circuitry. In embodiments, the interface circuitry 1452 may receive information and data via one or more networking links (not shown). For example, the interface circuitry 1452 may receive an indication of an access level of operation for a user. The interface circuitry 1452 may also receive other information include requests to update the firmware, change configuration settings, process workloads, invoke or restart a virtual environment, and so forth.

The functional block diagram 1400 may also include other components, such as a management controller 1462, a manageability engine 1415, and physical resources 1405. These components may operate and perform functions as the same named components discussed in FIG. 13. For example, the management controller 1462 may be a BMC or specialized processor capable of managing various aspects of a sled, such as the manageability engine (ME) or IE. The ME 1415 may be an interface to enable interactions between high-level and low-level hardware systems of a sled. The physical resources 1405 may be utilized by clients to perform workloads. Embodiments are not limited to these examples.

In embodiments, the functional block diagram 1400 includes other systems and components such as one or more of a BIOS, a unified extensible firmware interface (UEFI), and a system management mode component (SMM) 1417. These components may define a software interface between an operating system and platform firmware and provide a system management mode of operation for executing privileged instructions, e.g. a ring—2 mode of operation.

In embodiments, the functional block diagram 1400 and system includes a virtual machine manager (VMM) 1455 which may provide a virtual management functionality for a data center, racks, and sleds. In embodiments, the VMM 1455 may enable a user to configure and manage virtualization hosts, networking, storage resources to deploy one or more virtual machines 1457, for example. A virtual machine 1457 may be dynamically created and destroyed on a system and provide a virtual environment in which a user may utilize to process workloads. As previously discussed, the virtual machines 1457 may enable a user to configure certain settings, such as BIOS settings, without affected settings on the same system or sled set in a different virtual environment.

Figure 15:
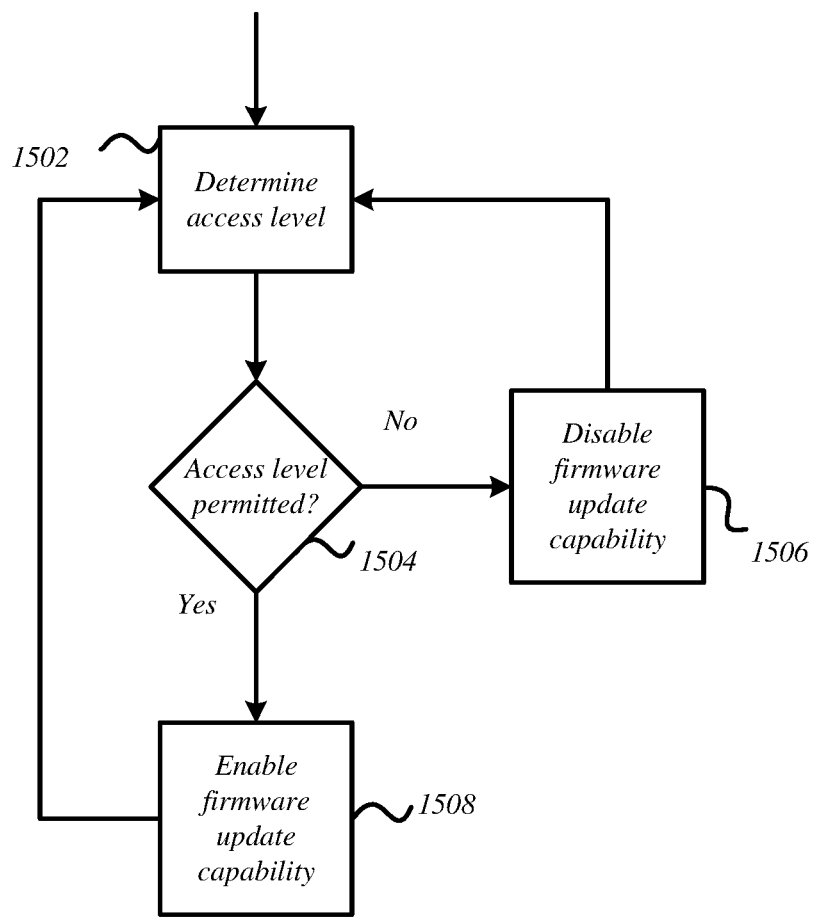
FIG. 15 illustrates an example of a first logic flow diagram.

FIG. 15 illustrates an embodiment of logic flow 1500. The logic flow 1500 may be representative of some or all of the operations executed by one or more embodiments described herein. For example, the logic flow 1500 may illustrate operations performed by a sled, and in particular circuitry, to enable or disable a firmware update capability. However, embodiments are not limited in this, and one or more operations may be performed by other components or systems discussed herein.

At block 1502, the logic flow 1500 may include determining an access level of operation for a user or administrator attempting to access and update a firmware device of a sled. In some instances, the access level of operation may be provided to a sled and circuitry from a pod management controller used to control a data center. An indication of an access level of operation may be communicated to a sled in an OOB communication utilizing one or more Ethernet links or other OOB management links, such as an Omni-path link with virtual local area network (VLAN) support or via WiFi. Moreover, the access level of operation may be communicated utilize a protocol, such as IMPI or Redfish In embodiments, the access level of operation may indicate or be used to determine which updates and configuration changes a user or administrator is permitted to make to a sled and components thereof. In some instances, the access level of operation may be communicated to a sled when a user or administrator is initially trying to access the sled, e.g. when a sled is being composed. In another example, a user may be attempting to utilize the sled and physical resources to process a workload and attempting to make updates and changes when generating a virtual machine environment for the workload. Embodiments are not limited to these examples.

At decision block 1504, a determination may be made as to whether a user or administrator has permission to complete the update or configuration change based on the access level of operation. Embodiments may include determining whether to enable or disable a firmware update capability based on an access level of operation. For example, an administrator may be enabled to update a firmware device of the sled. Alternatively, a user may not be able to update a firmware device.

In some embodiments, some users may be permitted to update a firmware device based on a priority level associated with the user. For example, a user having a higher level priority may be enabled to update the firmware device, while a user having a lower priority level may be denied updating the firmware device. The priority may be based on a scale, e.g. from 1 to 10, and various levels may be permitted to update a firmware device. For example, users having a priority level from 1-5 may be permitted to update a firmware device, while users having a priority level from 6-10 may not be permitted to update the firmware device. The access level of operations and priority levels having permission to update firmware may be determined at the time of manufacturing or configurable by an administrator. In some embodiments, the priority level may be a privilege level for a user or administrator, such as Administrator, Root, Super User (SU), and so forth.

In some embodiments, different access levels of operation may be permitted to update firmware for particular firmware devices, while not permitted to update firmware for other devices. For example, a user may be permitted to update firmware for an add-in component, but not the management controller. Each access level of operation may be assigned firmware devices for which they are permitted to update.

At block 1506, the logic flow 1500 includes disabling a firmware update capability for a firmware device based on the access level of operation. To disable the firmware update capability, the SMM will not perform the firmware update for the firmware device for uses that do not have the appropriate access level of operation or update privilege. In some instances, embodiments may include causing a BIOS to communicate disable firmware update capability information via a SMBUS or an in-band communication link to the firmware device.

At block 1508, the logic flow 1500 include enabling a firmware update capability for a firmware device based on the access level of operation. To enable the firmware update capability, embodiments may include permitting the interrupt (SMI) enable the firmware update capability and to prevent the interrupt (SMI) to disable the firmware update capability to change the firmware. In another example, embodiments may include causing the BIOS to communicate enable firmware update capability information via the SMBUS or the in-band communication link to the firmware device to enable the firmware update capability. Embodiments are not limited to these examples.

Figure 16:
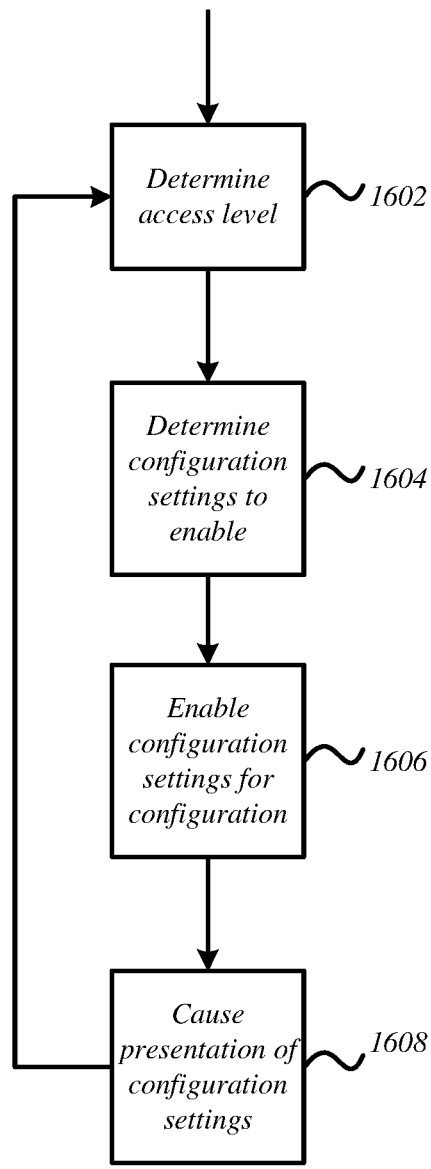
FIG. 16 illustrates an example of a second logic flow diagram.

FIG. 16 illustrates an embodiment of logic flow 1600. The logic flow 1600 may be representative of some or all of the operations executed by one or more embodiments described herein. For example, the logic flow 1600 may illustrate operations performed by a sled, and in particular circuitry, to enable or disable BIOS settings for configuration. In embodiments, the BIOS settings may be determined and presented to a user during a boot sequence of a sled or invocation of a virtual machine instance. These and other details will become more apparent in the following description.

At block 1602, the logic flow 1600 may include determining an access level of operation for a user or administrator attempting to access and update configuration or BIOS settings of a sled. In some instances, the access level of operation may be provided to a sled and circuitry from a pod management controller used to control a data center. An indication of an access level of operation may be communicated to a sled in an OOB communication utilizing one or more Ethernet links or other management links from the pod management controller.

In embodiments, the access level of operation may indicate or be used to determine which configuration changes a user or administrator is permitted to make to a sled and components thereof and presented in a display. In some instances, the access level of operation may be communicated to a sled when a user or administrator is initially trying to access the sled, e.g. when a sled is being composed. In another example, a user may be attempting to utilize the sled and physical resources to process a workload and attempting to make updates and changes when generating a virtual machine environment for the workload. Embodiments are not limited to these examples.

At block 1604, the logic flow 1600 includes determining which configuration settings a user or administrator is permitted to change. In embodiments, these configuration settings may include BIOS setting, such as those presented in a BIOS menu during a boot sequence of a sled or initialization of a virtual machine environment.

In embodiments, the determination is based on the access level of operation. In some instances, an administrator may be permitted to change all of the configuration settings, while a user may not be permitted to change the configuration settings. In embodiments, a user may be permitted to change particular configuration settings. For example, a user having a higher access level of operation may be capable of changing more configuration settings than a user having a lower access level of operation. In some embodiments, the configuration settings enabled may be set by an administrator. More specifically, an administrator may determine which configuration settings a user can adjust via the access level of operation.

At block 1606, the logic flow 1600 includes enabling configuration settings for configuration. The enabled configuration settings are based on the access level of operation. In some instances, which configuration settings may be communicated to circuitry from a pod management controller. In other instances, circuitry may perform a look up in a database or data store based on the access level of operation. In some instances, a user may not be enabled to change any configuration settings may be presented with information indicating as such.

At block 1608, the logic flow 1600 includes causing presentation of the enabled configuration settings. For example, a display may be generated having the configuration settings a user/administrator is enabled to change or set. The display may be presented to a user on a client device via one or more networking links in cloud-based computing environment. In some instances, the configuration settings may be applied in a virtual machine operating environment. As previously discussed, configuration settings may be different between virtual machine environments on the same system or sled. Embodiments are not limited in this manner.

FIG. 17 illustrates an embodiment of logic flow 1700. The logic flow 1700 may be representative of some or all of the operations executed by one or more embodiments described herein. For example, the logic flow 1700 may illustrate operations performed by a sled, and in particular circuitry, to enable or disable a firmware update capability.

However, embodiments are not limited in this, and one or more operations may be performed by other components or systems discussed herein.

The logic flow 1700, at block 1705, includes determining an access level of operation based on an indication received via one or more network links from a pod management controller. The access level of operation may be associated with a user or administrator and indicate whether the user or administrator is permitted to update a firmware device or not. In some embodiments, the access level of operation may be a priority level and circuitry may determine whether a user or administrator is permitted to update a firmware device based on the priority level. At block 1710, the logic flow includes enabling or disabling a firmware update capability for a firmware device based on the access level of operation, the firmware update capability to change firmware for the firmware device.

Figure 18:
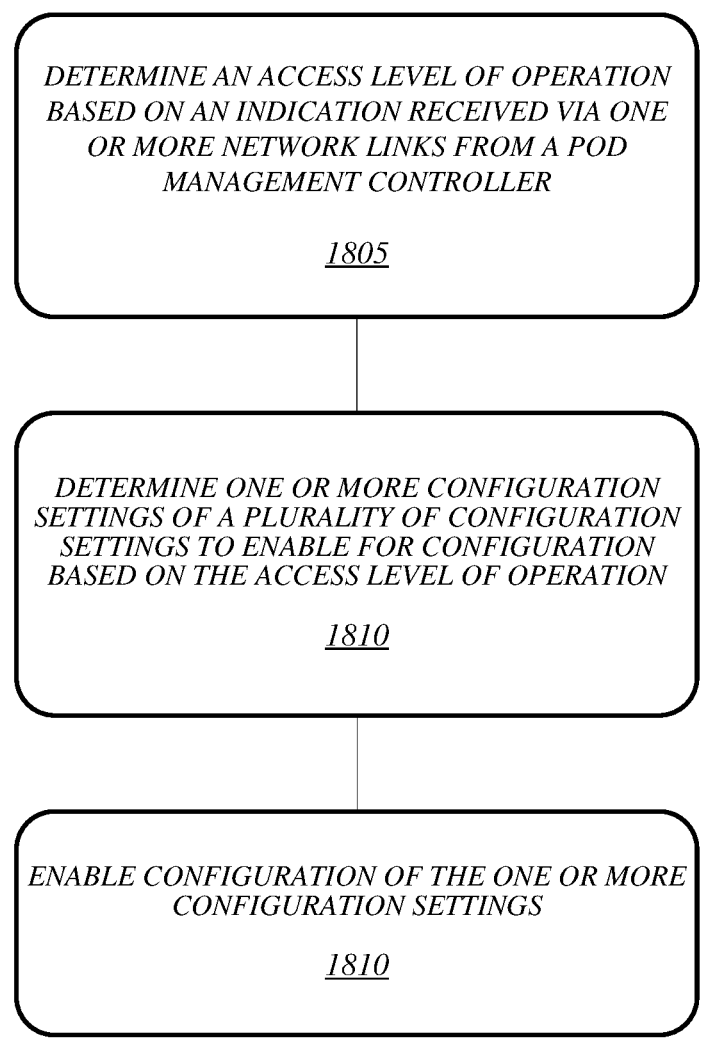
FIG. 18 illustrates an example of a fourth logic flow diagram.

FIG. 18 illustrates an embodiment of logic flow 1800. The logic flow 1800 may be representative of some or all of the operations executed by one or more embodiments described herein. For example, the logic flow 1800 may illustrate operations performed by a sled, and in particular circuitry, to enable or disable configuration settings for configuration. In embodiments, the BIOS settings may be determined and presented to a user during a boot sequence of a sled or invocation of a virtual machine instance. These and other details will become more apparent in the following description.

At block 1805, the logic flow 1800 includes determining an access level of operation based on an indication received via one or more network links from a pod management controller. Further and at block 1810, the logic flow 1800 includes determining one or more configuration settings of a plurality of configuration settings to enable for configuration based on the access level of operation. The logic flow 1800 includes enabling configuration of the one or more configuration settings. Embodiments are not limited in this manner.

The detailed disclosure now turns to providing examples that pertain to further embodiments. Examples one through thirty-six (1-36) provided below are intended to be exemplary and non-limiting.

In a first example, a system, a device, an apparatus, and so forth may include processing circuitry, and logic to determine an access level of operation for based on an indication received via one or more network links from a pod management controller, and enable or disable a firmware update capability for a firmware device of based on the access level of operation, the firmware update capability to change firmware for the firmware device.

In a second example and in furtherance of the first example, a system, a device, an apparatus, and so forth including the logic to disable the firmware update capability via a management mode and to enable the firmware update capability via the management mode, the management mode to prevent processing of an interrupt to disable the firmware update capability and to allow processing of the interrupt to enable the firmware update capability.

In a third example and in furtherance of any of the previous examples, a system, a device, an apparatus, and so forth including the logic to cause a basic input/output system (BIOS) to communicate disable firmware update capability information via a system management bus (SMBUS) or an in-band communication link to the firmware device to disable the firmware update capability and cause the BIOS to communicate enable firmware update capability information via the SMBUS or the in-band communication link to the firmware device to enable the firmware update capability.

In a fourth example and in furtherance of any of the previous examples, a system, a device, an apparatus, and so forth including the logic to enable the firmware update capability if the access level of operation is an administrative access level and to disable the firmware update capability if the access of operation is a user access level.

In a fifth example and in furtherance of any of the previous examples, a system, a device, an apparatus, and so forth wherein one of a basic input/output system (BIOS), a management entity (ME), a baseboard management controller, a memory module, a storage device, an accelerator device, and a field-programmable gate array device comprises the firmware device.

In a sixth example and in furtherance of any of the previous examples, a system, a device, an apparatus, and so forth including the logic to receive the indication indicating the access level of operation comprising one of an administrative access level and a user access level from the pod management controller.

In a seventh example and in furtherance of any of the previous examples, a system, a device, an apparatus, and so forth including a network interface coupled with the processing circuitry and the one or more network links, and the network interface to receive the indication via the one or more network links from the pod management controller during a boot sequence.

In an eighth example and in furtherance of any of the previous examples, a system, a device, an apparatus, and so forth including processing circuitry, and logic to determine an access level of operation based on an indication received via one or more network links from a pod management controller, determine one or more configuration settings of a plurality of configuration settings to enable for configuration based on the access level of operation, and enable configuration of the one or more configuration settings.

In a ninth example and in furtherance of any of the previous examples, a system, a device, an apparatus, and so forth including the access level of operation comprising one of a plurality of user access levels, and the logic to determine which of the one or more configuration settings to enable based on the one of the plurality of user access levels.

In a tenth example and in furtherance of any of the previous examples, a system, a device, an apparatus, and so forth including the access level of operation comprising an administrative user access level, and the logic to determine to enable the plurality of configuration settings for configuration.

In an eleventh example and in furtherance of any of the previous examples, a system, a device, an apparatus, and so forth including logic to determine another access level of operation based on another indication received via one or more network links from the pod management controller, determine another one or more configuration settings of the plurality of configuration settings to enable for configuration for the another access level of operation, and enable configuration of the another one or more configuration settings.

In a twelfth example and in furtherance of any of the previous examples, a system, a device, an apparatus, and so forth including the logic to enable configuration of the one or more configuration settings in a first virtual environment and enable configuration of the another one or more configuration settings in a second virtual environment.

In a thirteenth example and in furtherance of any of the previous examples, a non-transitory computer-readable storage medium, comprising a plurality of instructions, that when executed, enable processing circuitry to determine an access level of operation based on an indication received via one or more network links from a pod management controller, and enable or disable a firmware update capability for a firmware device based on the access level of operation, the firmware update capability to change firmware for the firmware device.

In a fourteenth example and in furtherance of any of the previous examples, a non-transitory computer-readable storage medium, comprising a plurality of instructions, that when executed, enable processing circuitry to disable the firmware update capability via a management mode by preventing processing of an interrupt, and enable the firmware update capability via the management mode by allowing processing of the interrupt.

In a fifteenth example and in furtherance of any of the previous examples, a non-transitory computer-readable storage medium, comprising a plurality of instructions, that when executed, enable processing circuitry to cause a basic input/output system (BIOS) to communicate disable firmware update capability information via a system management bus (SMBUS) or an in-band communication link to the firmware device to disable the firmware update capability, and cause the BIOS to communicate enable firmware update capability information via the SMBUS or the in-band communication link to the firmware device to enable the firmware update capability.

In a sixteenth example and in furtherance of any of the previous examples, a non-transitory computer-readable storage medium, comprising a plurality of instructions, that when executed, enable processing circuitry to enable the firmware update capability if the access level of operation is an administrative access level and to disable the firmware update capability if the access of operation is a user access level.

In a seventeenth example and in furtherance of any of the previous examples, a non-transitory computer-readable storage medium, wherein one of a basic input/output system (BIOS), a management entity (ME), a baseboard management controller, a memory module, a storage device, an accelerator device, and a field-programmable gate array device comprises the firmware device.

In an eighteenth example and in furtherance of any of the previous examples, a non-transitory computer-readable storage medium, comprising a plurality of instructions, that when executed, enable processing circuitry to receive the indication indicating the access level of operation comprising one of an administrative access level and a user access level from the pod management controller.

In a nineteenth example and in furtherance of any of the previous examples, a non-transitory computer-readable storage medium, comprising a plurality of instructions, that when executed, enable processing circuitry to receive, via network interface and one or more network links, the indication from the pod management controller during a boot sequence.

In a twentieth example and in furtherance of any of the previous examples, a non-transitory computer-readable storage medium, comprising a plurality of instructions, that when executed, enable processing circuitry to determine an access level of operation system based on an indication received via one or more network links from a pod management controller, determine one or more configuration settings of a plurality of configuration settings to enable for configuration based on the access level of operation, and enable configuration of the one or more configuration settings.

In a twenty-first example and in furtherance of any of the previous examples, a non-transitory computer-readable storage medium, comprising the access level of operation comprising one of a plurality of user access levels, and the processing circuitry to determine which of the one or more configuration settings to enable based on the one of the plurality of user access levels.

In a twenty-second example and in furtherance of any of the previous examples, a non-transitory computer-readable storage medium, comprising the access level of operation comprising an administrative user access level, and the processing circuitry to determine to enable the plurality of configuration settings for configuration.

In a twenty-third example and in furtherance of any of the previous examples, a non-transitory computer-readable storage medium, comprising a plurality of instructions, that when executed, enable processing circuitry to determine another access level of operation based on another indication received via one or more network links from the pod management controller, determine another one or more configuration settings of the plurality of configuration settings to enable for configuration for the another access level of operation, and enable configuration of the another one or more configuration settings.

In a twenty-fourth example and in furtherance of any of the previous examples, a non-transitory computer-readable storage medium, comprising a plurality of instructions, that when executed, enable processing circuitry to enable configuration of the one or more configuration settings in a first virtual environment and enable configuration of the another one or more configuration settings in a second virtual environment.

In a twenty-fifth example and in furtherance of any of the previous examples, a computer-implemented method may include determining an access level of operation based on an indication received via one or more network links from a pod management controller, and enabling or disabling a firmware update capability for a firmware device based on the access level of operation, the firmware update capability to change firmware for the firmware device.

In a twenty-sixth example and in furtherance of any of the previous examples, a computer-implemented method may include disabling the firmware update capability via a management mode by preventing processing of an interrupt, and enabling the firmware update capability via the management mode by allowing processing of the interrupt.

In a twenty-seventh example and in furtherance of any of the previous examples, a computer-implemented method may include causing a basic input/output system (BIOS) to communicate disable firmware update capability information via a system management bus (SMBUS) or an in-band communication link to the firmware device to disable the firmware update capability, and causing the BIOS to communicate enable firmware update capability information via the SMBUS or the in-band communication link to the firmware device to enable the firmware update capability.

In a twenty-eighth example and in furtherance of any of the previous examples, a computer-implemented method may include enabling the firmware update capability if the access level of operation is an administrative access level and to disable the firmware update capability if the access of operation is a user access level.

In a twenty-ninth example and in furtherance of any of the previous examples, a computer-implemented method wherein one of a basic input/output system (BIOS), a management entity (ME), a baseboard management controller, a memory module, a storage device, an accelerator device, and a field-programmable gate array device comprises the firmware device.

In a thirtieth example and in furtherance of any of the previous examples, a computer-implemented method may include receiving the indication indicating the access level of operation comprising one of an administrative access level and a user access level from the pod management controller.

In a thirty-first example and in furtherance of any of the previous examples, a computer-implemented method may include receiving, via network interface and one or more network links, the indication from the pod management controller during a boot sequence.

In a thirty-second example and in furtherance of any of the previous examples, a computer-implemented method may include determining an access level of operation based on an indication received via one or more network links from a pod management controller, determining one or more configuration settings of a plurality of configuration settings to enable for configuration based on the access level of operation, and enabling configuration of the one or more configuration settings.

In a thirty-third example and in furtherance of any of the previous examples, a computer-implemented method may include the access level of operation comprising one of a plurality of user access levels, and the processing circuitry to determine which of the one or more configuration settings to enable based on the one of the plurality of user access levels.

In a thirty-fourth example and in furtherance of any of the previous examples, a computer-implemented method may include the access level of operation comprising an administrative user access level, and the processing circuitry to determine to enable the plurality of configuration settings for configuration.

In a thirty-fifth example and in furtherance of any of the previous examples, a computer-implemented method may include determining another access level of operation based on another indication received via one or more network links from the pod management controller, determining another one or more configuration settings of the plurality of configuration settings to enable for configuration for the another access level of operation, and enabling configuration of the another one or more configuration settings.

In a thirty-sixth example and in furtherance of any of the previous examples, a computer-implemented method may include enabling configuration of the one or more configuration settings in a first virtual environment and enable configuration of the another one or more configuration settings in a second virtual environment.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture? It is, of course, not possible to describe every conceivable combination of components and methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. Cloud computing system for use in providing at least one cloud-based service associated with execution of at least one workload, the cloud computing system being configurable for use with remote rack server resources that are to communicate with the cloud computing system via optical communication links and at least one switch, the cloud computing system comprising:
compute resources comprising at least one central processing unit and memory circuitry;
storage resources for use in association with the compute resources;
at least one optical fiber-based network for use in communicatively coupling at least certain of the compute resources and at least certain of the storage resources with the remote rack server resources via the optical communication links and the at least one switch;
management resources for use in allocating compute resources, the storage resources, and the remote rack server resources for use in the execution of the at least one workload;
wherein:
the at least one workload comprises at least one virtual machine workload and/or is implemented using at least one virtualization environment;
the compute resources and the storage resources are comprised in at least one cloud computing server;
the remote rack server resources are comprised in at least one rack server that is remote from the at least one cloud computing server;
the at least one rack server is to be communicatively coupled to the management resources via the optical communication links, the at least one switch, and the at least one optical fiber-based network;
the management resources are configurable to obtain rack server resource utilization data from the remote rack server resources for use in the allocating of the remote rack server resources;
the management resources are configurable to dynamically reallocate, based upon past resource utilization data, resource utilization prediction data, and machine-learning, the compute resources, the storage resources, and/or the remote rack server resources for use in the execution of the at least one workload;
the at least one switch is to process communication that is in accordance with multiple link-layer protocols to enable dynamic allocation and/or dynamic reallocation of at least certain of the compute resources, the storage resources, and/or the remote rack server resources for use in the execution of the at least one workload; and
the multiple-link layer protocols are different from each other, at least in part.

2. The cloud computing system of claim 1, wherein:
the compute resources, accelerator resources, and the storage resources are comprised, at least in part, in one or more pools of resources for being dynamically allocated based upon the resource utilization data.

3. The cloud computing system of claim 2, wherein:
the management resources are configurable to dynamically reallocate, based upon the past resource utilization data, the resource utilization prediction data, and the machine-learning, the compute resources, the storage resources, and the remote rack server resources for use in the execution of the at least one workload.

4. The cloud computing system of claim 3, wherein:
the cloud computing system is configurable to use telemetry data from the compute resources, the storage resources, and/or the remote rack server resources in capacity planning and/or management related to the compute resources, the storage resources, and/or the remote rack server resources.

5. The cloud computing system of claim 4, wherein:
the cloud computing system comprises at least one data center; and
the at least one data center comprises the compute resources and the storage resources.

6. At least one non-transitory machine-readable memory storing instructions for being executed by circuitry associated with a cloud computing system, the cloud computing system being for use in providing at least one cloud-based service associated with execution of at least one workload, the cloud computing system being configurable for use with remote rack server resources that are to communicate with the cloud computing system via optical communication links and at least one switch, the cloud computing system including compute resources, storage resources, at least one optical fiber-based network, and management resources, the instructions, when executed by the circuitry, resulting in the cloud computing system being configured for performance of operations comprising:
allocating, by the management resources, the compute resources, the storage resources, and the remote rack server resources for use in the execution of the at least one workload;
wherein:
the compute resources comprise at least one central processing unit and memory circuitry;
the storage resources are for use in association with the compute resources;
the at least one optical fiber-based network is for use in communicatively coupling at least certain of the compute resources and at least certain of the storage resources with the remote rack server resources via the optical communication links and the at least one switch;
the at least one workload comprises at least one virtual machine workload and/or is implemented using at least one virtualization environment;
the compute resources and the storage resources are comprised in at least one cloud computing server;
the remote rack server resources are comprised in at least one rack server that is remote from the at least one cloud computing server;
the at least one rack server is to be communicatively coupled to the management resources via the optical communication links, the at least one switch, and the at least one optical fiber-based network;
the management resources are configurable to obtain rack server resource utilization data from the remote rack server resources for use in the allocating of the remote rack server resources;
the management resources are configurable to dynamically reallocate, based upon past resource utilization data, resource utilization prediction data, and machine-learning, the compute resources, the storage resources, and/or the remote rack server resources for use in the execution of the at least one workload;

the at least one switch is to process communication that is in accordance with multiple link-layer protocols to enable dynamic allocation and/or dynamic reallocation of at least certain of the compute resources, the storage resources, and/or the remote rack server resources for use in the execution of the at least one workload: and the multiple-link layer protocols are different from each other, at least in part.

7. The at least one non-transitory machine-readable memory of claim 6, wherein:

the compute resources, the accelerator resources, and the storage resources are comprised, at least in part, in one or more pools of resources for being dynamically allocated based upon the resource utilization data.

8. The at least one non-transitory machine-readable memory of claim 7, wherein:

the management resources are configurable to dynamically reallocate, based upon the past resource utilization data, the resource utilization prediction data, and the machine-learning, the compute resources, the storage resources, and the remote rack server resources for use in the execution of the at least one workload.

9. The at least one non-transitory machine-readable memory of claim 8, wherein:

the cloud computing system is configurable to use telemetry data from the compute resources, the storage resources, and/or the remote rack server resources in capacity planning and/or management related to the compute resources, the storage resources, and/or the remote rack server resources.

10. The at least one non-transitory machine-readable memory of claim 9, wherein:

the cloud computing system comprises at least one data center; and the at least one data center comprises the compute resources and the storage resources.

11. A method implemented using a cloud computing system, the cloud computing system being for use in providing at least one cloud-based service associated with execution of at least one workload, the cloud computing system being configurable for use with remote rack server resources that are to communicate with the cloud computing system via optical communication links and at least one switch, the cloud computing system including compute resources, storage resources, at least one optical fiber-based network, and management resources, the method comprising:

allocating, by the management resources, the compute resources, the storage resources, and the remote rack server resources for use in the execution of the at least one workload;

wherein:

the compute resources comprise at least one central processing unit and memory circuitry;

the storage resources are for use in association with the compute resources;

the at least one optical fiber-based network is for use in communicatively coupling at least certain of the compute resources and at least certain of the storage resources with the remote rack server resources via the optical communication links and the at least one switch;

the at least one workload comprises at least one virtual machine workload and/or is implemented using at least one virtualization environment;

the compute resources and the storage resources are comprised in at least one cloud computing server;

the remote rack server resources are comprised in at least one rack server that is remote from the at least one cloud computing server;

the at least one rack server is to be communicatively coupled to the management resources via the optical communication links, the at least one switch, and the at least one optical fiber-based network;

the management resources are configurable to obtain rack server resource utilization data from the remote rack server resources for use in the allocating of the remote rack server resources;

the management resources are configurable to dynamically reallocate, based upon past resource utilization data, resource utilization prediction data, and machine-learning, the compute resources, the storage resources, and/or the remote rack server resources for use in the execution of the at least one workload;

the at least one switch is to process communication that is in accordance with multiple link-layer protocols to enable dynamic allocation and/or dynamic reallocation of at least certain of the compute resources, the storage resources, and/or the remote rack server resources for use in the execution of the at least one workload: and the multiple-link layer protocols are different from each other, at least in part.

12. The method of claim 11, wherein:

the compute resources, accelerator resources, and the storage resources are comprised, at least in part, in one or more pools of resources for being dynamically allocated based upon the resource utilization data.

13. The method of claim 12, wherein:

the management resources are configurable to dynamically reallocate, based upon the past resource utilization data, the resource utilization prediction data, and the machine-learning, the compute resources, the storage resources, and the remote rack server resources for use in the execution of the at least one workload.

14. The method of claim 13, wherein:

the cloud computing system is configurable to use telemetry data from the compute resources, the storage resources, and/or the remote rack server resources in capacity planning and/or management related to the compute resources, the storage resources, and/or the remote rack server resources.

15. The method of claim 14, wherein:

the cloud computing system comprises at least one data center; and the at least one data center comprises the compute resources and the storage resources.

\* \* \* \* \*